(12) United States Patent
Abe

(10) Patent No.: US 6,396,955 B1
(45) Date of Patent: May 28, 2002

(54) IMAGE COMPRESSION AND EXPANSION DEVICE

(75) Inventor: Nobuaki Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,380

(22) Filed: Jun. 23, 1999

(30) Foreign Application Priority Data

Jun. 25, 1998 (JP) .......................... 10-178891
Jul. 8, 1998 (JP) .......................... 10-193122

(51) Int. Cl.[7] .............................. G06K 9/36
(52) U.S. Cl. .................. 382/232; 382/248; 382/250
(58) Field of Search .................. 382/232, 248, 382/250; 358/261.2; 235/462.3

(56) References Cited

U.S. PATENT DOCUMENTS

| | | | | |
|---|---|---|---|---|
| 3,705,359 A | * | 12/1972 | Kappes | 329/104 |
| 3,755,808 A | * | 8/1973 | Candiani | 340/347 |
| 4,628,472 A | * | 12/1986 | Fensch | 364/759 |
| 4,807,042 A | * | 2/1989 | Tanaka | 358/260 |
| 5,497,246 A | | 3/1996 | Abe | 358/426 |
| 5,666,209 A | | 9/1997 | Abe | 386/109 |
| 5,689,612 A | | 11/1997 | Abe | 386/109 |
| 5,708,509 A | | 1/1998 | Abe | 358/426 |
| 5,764,800 A | | 6/1998 | Yamagata | 382/232 |
| 5,805,737 A | | 9/1998 | Abe | 382/246 |
| 5,886,790 A | | 3/1999 | Abe | 358/261.2 |
| 5,937,098 A | | 8/1999 | Abe | 382/239 |

OTHER PUBLICATIONS

Aas et al., "Minimum Mean–Squared Error Transform Coding and Subband Coding", IEEE Transactions on Information Theory, vol. 42, No. 4, Jul. 1996, pp. 1179–1192.*

* cited by examiner

Primary Examiner—Jose L. Couso
Assistant Examiner—Anh Hong Do
(74) Attorney, Agent, or Firm—Greenblum & Bernstein, P.L.C.

(57) ABSTRACT

An image compression device to compress a still image comprises a DCT processing circuit, a quantization processing circuit, a bit separation processing circuit, a grouping circuit, and an encoding processing circuit. In the bit separation processing circuit, quantized DCT coefficients are subjected to a bit separation processing, such that higher-rank quantized DCT coefficients and lower-rank quantized DCT coefficients are obtained. Thus, a total bit number (length) of compressed image data is decreased. An image expansion device to expand the compressed image data comprises a decoding processing circuit, an inverse grouping circuit, a bit synthesis processing circuit, a dequantization processing circuit, and an IDCT processing circuit. In the bit synthesis processing circuit, the higher-rank quantized DCT coefficients and the lower-rank quantized DCT coefficients are subjected to a bit synthesis processing, such that the quantized DCT coefficients are obtained. Thus, the original still image data is reproduced.

16 Claims, 16 Drawing Sheets

| GROUP NUMBER C | Zm | BIT NUMBER OF ADDED BITS |
|---|---|---|
| 0 | 0 | 0 |
| 1 | −1,1 | 1 |
| 2 | −3,−2,2,3 | 2 |
| 3 | +7,−4,4,7 | 3 |
| 4 | −15..−8,8..15 | 4 |
| 5 | −31..−16,16..31 | 5 |
| 6 | −63..−32,32..63 | 6 |
| 7 | −127..−64,64..127 | 7 |
| 8 | −255..−128,128..255 | 8 |
| 9 | −511..−256,256..511 | 9 |
| 10 | −1023..−512,512..1023 | 10 |

T1

| GROUP NUMBER C | Zm | BIT NUMBER OF ADDED BITS |
|---|---|---|
| 0 | 0 | 0 |
| 1 | 1 | 0 |
| 2 | 2,3 | 1 |
| 3 | 4..7 | 2 |
| 4 | 8..15 | 3 |
| 5 | 16..31 | 4 |
| 6 | 32..63 | 5 |
| 7 | 64..127 | 6 |
| 8 | 128..255 | 7 |
| 9 | 256..511 | 8 |
| 10 | 512..1023 | 9 |

FIG. 7

$Z_1 = 25$ $\begin{pmatrix} R = 0 \\ C = 5 \end{pmatrix}$ CODEWORD 11010

ADDED BITS $\begin{pmatrix} T0 & 11001 \\ T1 & 1001 \end{pmatrix}$ $Z_4 = 3$ $\begin{pmatrix} R = 2 \\ C = 2 \end{pmatrix}$ CODEWORD 11111001

ADDED BITS $\begin{pmatrix} T0 & 11 \\ T1 & 1 \end{pmatrix}$ $Z_{10} = 1$ $\begin{pmatrix} R = 5 \\ C = 1 \end{pmatrix}$ CODEWORD 1111010

ADDED BITS $\begin{pmatrix} T0 & 1 \\ T1 & \end{pmatrix}$

↓

HEB $\begin{cases} T0 & \underline{1101011001}\ \underline{11111100111}\ \underline{11110101}\cdots \\ & Z_1 \qquad\qquad Z_4 \qquad\qquad Z_{10} \\ T1 & \underline{110101001}\ \underline{111110011}\ \underline{1111010}\cdots \\ & Z_1 \qquad\qquad Z_4 \qquad\qquad Z_{10} \end{cases}$

| | | |
|---|---|---|
| 0/0 (EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 ∼ $Z_1$ |
| 0/6 | 7 | 1111000 |
| 0/7 | 8 | 11111000 |
| 0/8 | 10 | 1111110110 |
| 0/9 | 16 | 1111111110000010 |
| 0/A | 16 | 1111111110000011 |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 16 | 1111111110000100 |
| 1/7 | 16 | 1111111110000101 |
| 1/8 | 16 | 1111111110000110 |
| 1/9 | 16 | 1111111110000111 |
| 1/A | 16 | 1111111110001000 |
| 2/1 | 5 | 11100 |
| 2/2 | 8 | 11111001 ∼ $Z_4$ |
| 2/3 | 10 | 1111110111 |
| 2/4 | 12 | 111111110100 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |
| 3/1 | 6 | 111010 |
| 3/2 | 9 | 111110111 |
| 3/3 | 12 | 111111110101 |
| 3/4 | 16 | 1111111110001111 |
| 3/5 | 16 | 1111111110010000 |
| 3/6 | 16 | 1111111110010001 |
| 3/7 | 16 | 1111111110010010 |
| 3/8 | 16 | 1111111110010011 |

| | | |
|---|---|---|
| 3/9 | 16 | 1111111110010100 |
| 3/A | 16 | 1111111110010101 |
| 4/1 | 6 | 111011 |
| 4/2 | 10 | 1111111000 |
| 4/3 | 16 | 1111111110010110 |
| 4/4 | 16 | 1111111110010111 |
| 4/5 | 16 | 1111111110011000 |
| 4/6 | 16 | 1111111110011001 |
| 4/7 | 16 | 1111111110011010 |
| 4/8 | 16 | 1111111110011011 |
| 4/9 | 16 | 1111111110011100 |
| 4/A | 16 | 1111111110011101 |
| 5/1 | 7 | 1111010 ∼ $Z_{10}$ |
| 5/2 | 11 | 11111110111 |
| 5/3 | 16 | 1111111110011110 |

FIG. 12

$$D = (D_{ji}) = \begin{pmatrix} 131 & 49 & -16 & 3 & 1 & 1 & 0 & 0 \\ -78 & 36 & -2 & -4 & 0 & 0 & 0 & 0 \\ 1 & -7 & 2 & -1 & -1 & 0 & 1 & 0 \\ -8 & -2 & 3 & -1 & 0 & 1 & 1 & 0 \\ -1 & -3 & 0 & 0 & 0 & 0 & 0 & 0 \\ -2 & 0 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \end{pmatrix}$$

$D_{31}$ is marked; $-2$ is circled.

QUANTIZED DCT COEFFICIENTS $$Q = (Q_{ji}) = \begin{pmatrix} 2 & 1 & 1 & 2 & 2 & 4 & 5 & 6 \\ 1 & 1 & 1 & 2 & 3 & 6 & 6 & 6 \\ 1 & 1 & 2 & 2 & 4 & 6 & 7 & 6 \\ 1 & 2 & 2 & 3 & 5 & 9 & 8 & 6 \\ 2 & 2 & 4 & 6 & 7 & 11 & 10 & 8 \\ 2 & 4 & 6 & 6 & 8 & 10 & 11 & 9 \\ 5 & 6 & 8 & 9 & 10 & 12 & 12 & 10 \\ 7 & 9 & 10 & 10 & 11 & 10 & 10 & 10 \end{pmatrix}$$

$Q_{31}$ is marked; $2$ is circled.

QUANTIZATION COEFFICIENTS $$C' = (C'_{ji}) = \begin{pmatrix} 262 & 49 & -16 & 6 & 2 & 4 & 0 & 0 \\ -78 & 36 & -2 & -8 & 0 & 0 & 0 & 0 \\ 1 & -7 & 4 & -2 & -4 & 0 & 7 & 0 \\ -8 & -4 & 6 & -3 & 0 & 9 & 8 & 0 \\ -2 & -6 & 0 & 0 & 0 & 0 & 0 & 0 \\ -4 & 0 & 0 & 0 & 0 & 0 & 0 & 0 \\ -5 & 0 & 0 & 0 & 0 & 0 & 0 & 0 \\ 0 & 0 & 0 & 0 & 0 & 0 & 0 & 0 \end{pmatrix}$$

$C'_{31}$ is marked; $-4$ is circled.

DCT COEFFICIENTS

↓ IDCT $$P' = (P'_{yx}) = \begin{pmatrix} 159 & 152 & 159 & 151 & 139 & 139 & 133 & 132 \\ 165 & 164 & 163 & 158 & 150 & 143 & 136 & 133 \\ 165 & 169 & 161 & 161 & 158 & 145 & 139 & 133 \\ 166 & 168 & 161 & 165 & 164 & 152 & 148 & 141 \\ 170 & 165 & 166 & 169 & 165 & 160 & 158 & 152 \\ 173 & 165 & 169 & 170 & 166 & 166 & 164 & 159 \\ 175 & 170 & 173 & 173 & 174 & 175 & 171 & 167 \\ 173 & 174 & 172 & 174 & 181 & 181 & 176 & 173 \end{pmatrix}$$

8×8 PIXEL VALUES

IMAGE COMPRESSION AND EXPANSION DEVICE

BACKGROUND OF THE INVENTION

1. Field of the invention

The present invention relates to a compression device for compressing still color image data in accordance with a JPEG (Joint Photographic Expert Group) algorithm, and an expansion device for expanding the compressed image data to reproduce the still image.

2. Description of the Related Art

A standard algorithm, for encoding of a still image and transfer of the encoded image through telecommunication transmission channels, has been recommended by the JPEG. In order to enable a large-scale data compression, a baseline process of the JPEG algorithm breaks down original image data into components on a spatial frequency axis by using a two-dimensional discrete cosine transformation (DCT) process. Thereafter, data expressed on the spatial frequency axis is quantized using a quantization table. The quantized data is then encoded, using a Huffman table.

The encoded (or compressed) image data can be expanded by carrying out a process, which is the inverse of the compression process described above, so that the original image data can be reproduced. Namely, the compressed image data is decoded, is subjected to a dequantization process by using the quantization table, and is, finally, subjected to a two-dimensional inverse discrete cosine transformation (IDCT) process, so that the original data is reproduced.

However, since the JEPG algorithm, which is a lossy (unreversible) encoding and decoding process, cannot reproduce the original still image identically, because of the quantization process and dequantization process, picture quality of the reproduced image drops in comparison with that of the original image.

On the other hand, a lossless (reversible) encoding and decoding process, for example, a spatial predictive encoding and decoding process, can reproduce the original image identically. However, this compression process cannot compress a high-resolution image efficiently.

SUMMARY OF THE INVENTION

Accordingly, an object of the present invention is to provide an image compression and expansion device, that compresses a high-resolution image efficiently and expands compressed image data to reproduce the original image, while suppressing a degradation in picture quality.

An image compression device according to the present invention comprises an orthogonal transformation processor, a determiner, a calculator, a bit separation processor, a sign bit addition processor, a grouping processor, and an encoding processor.

The orthogonal transformation processor applies an orthogonal transformation to image data corresponding to a still image to obtain orthogonal transformation coefficients. The determiner determines whether a sign of each of the orthogonal transformation coefficients expressed as a bit sequence is negative. The calculator manipulates the bit sequence to reverse the sign, when the sign is negative. The bit separation processor separates either the bit sequence, when the sign of the orthogonal transformation coefficient is positive, or the manipulated bit sequence, when the sign of the orthogonal transformation coefficient is negative, to a higher-rank bit sequence and a lower-rank bit sequence to obtain a higher-rank orthogonal transformation coefficient and a lower-rank orthogonal transformation coefficient. The sign bit addition processor adds either an additional positive-sign bit to the lower-rank bit sequence, when the orthogonal transformation coefficient is positive, or an additional negative-sign bit to the lower-rank bit sequence when the orthogonal transformation coefficient is negative, to obtain a sign-included lower-rank orthogonal transformation coefficient. The grouping processor utilizes a group table to obtain zero run lengths, group numbers and added bits of the higher-rank orthogonal transformation coefficients. The encoding processor utilizes a Huffman table to determine a codeword corresponding to each of the zero run lengths and the group numbers, and combines the added bits and the codeword to generate compressed image data.

Further, an image compression and expansion device according to the present invention comprises an orthogonal transformation processor, a determiner, a calculator, a bit separation processor, a sign bit addition processor, a grouping processor, an encoding processor, a decoding processor, an inverse grouping processor, a bit synthesis processor, an inverse determiner, an inverse calculator, and an inverse orthogonal transformation processor.

The orthogonal transformation processor applies an orthogonal transformation to image data corresponding to a still image to obtain orthogonal transformation coefficients. The determiner determines whether a sign of each of the orthogonal transformation coefficients expressed as a bit sequence is negative. The calculator manipulates the bit sequence to reverse the sign, when the sign is negative. The bit separation processor separates either the bit sequence, when the sign of the orthogonal transformation coefficient is positive, or the manipulated bit sequence when the sign of the orthogonal transformation coefficient is negative, to a higher-rank bit sequence and a lower-rank bit sequence to obtain a higher-rank orthogonal transformation coefficient and a lower-rank orthogonal transformation coefficient. The sign bit addition processor adds either an additional positive-sign bit to the lower-rank bit sequence, when the orthogonal transformation coefficient is positive, or an additional negative-sign bit to the lower-rank bit sequence, when the orthogonal transformation coefficient is negative, to obtain a sign-included lower-rank orthogonal transformation coefficient. The grouping processor utilizes a group table to obtain zero run lengths, group numbers and added bits of the higher-rank orthogonal transformation coefficients. The encoding processor utilizes the Huffman table to determine a codeword corresponding to each of the zero run lengths and the group numbers, and combines the added bits and the codeword to generate compressed image data. The decoding processor utilizes a Huffman table to obtain the zero run lengths and the group numbers corresponding to the codewords from the compressed data. The inverse grouping processor utilizes the group table to reproduce the higher-rank orthogonal transformation coefficients, based on the zero run lengths, the group numbers and the added bits. The bit synthesis processor synthesizes the higher-rank bit sequence and the lower-rank bit sequence reproduced from the reproduced higher-rank orthogonal transformation coefficients to obtain the orthogonal transformation coefficients expressed as either the manipulated bit sequence or the bit sequence. The inverse determiner determines whether the sign-included lower-rank orthogonal transformation coefficient, corresponding to the lower-rank orthogonal transformation coefficient being subjected to the synthesis of the bit synthesis processor, has the additional negative-sign bit. The inverse calculator manipulates the manipulated bit sequence to reverse a sign of the corresponding reproduced orthogonal transformation coefficient when the sign-included lower-rank orthogonal transformation coefficient has the additional negative-sign bit. The inverse orthogonal transformation processor applies an inverse orthogonal transformation to the reproduced orthogonal transformation coefficients to obtain the image data corresponding to the still image.

An image expansion device according to the present invention comprises a decoding processor, a bit synthesis processor, a determiner, a calculator, and inverse orthogonal transformation, which expands compressed data composed of first data and second data. The first data are, for example, generated by an orthogonal transformation, bit separation processing and entropy encoding, and correspond to higher-rank orthogonal transformation coefficients. The second data are, for example, composed of sign bit data, which indicates a positive or negative, and separation data, which is generated by the bit separation processing and expressed as a bit sequence.

The decoding processor decodes the first data by an entropy decoding process to obtain the higher-rank orthogonal transformation coefficients expressed as higher-rank bit sequences. The bit synthesis processor synthesizes the higher-rank bit sequence of each of the higher-rank orthogonal transformation coefficients and the lower-rank bit sequence of the corresponding separation data to obtain orthogonal transformation coefficients. The determiner determines whether the sign bit data, which is corresponding to the separation data being subjected to a synthesis of the bit synthesis processor, is negative. The calculator reverses a sign of the orthogonal transformation coefficients when the corresponding sign bit data is negative. The inverse orthogonal transformation processor applies the orthogonal transformation coefficients to obtain image data corresponding to a still image.

An image compression device according to the present invention comprises an orthogonal transformation processor, a bit separation processor, a grouping processor, and an encoding processor.

The orthogonal transformation processor applies an orthogonal transformation to image data corresponding to a still image to obtain orthogonal transformation coefficients expressed as bit sequences. The bit separation processor separates each bit sequence to a higher-rank bit sequence and a lower-rank bit sequence to obtain a higher-rank orthogonal transformation coefficient and a lower-rank orthogonal transformation coefficient. The grouping processor utilizes a group table to obtain zero run lengths, group numbers and added bits of the higher-rank orthogonal transformation coefficients. The encoding processor utilizes a Huffman table to determine a codeword corresponding to each of the zero run lengths and the group numbers, and combines the added bits and the codeword to generate compressed image data.

Further, an image compression and expansion device comprises an orthogonal transformation processor, a bit separation processor, a grouping processor, an encoding processor, a decoding processor, an inverse grouping processor, a bit synthesis processor, and an inverse orthogonal transformation processor.

The orthogonal transformation processor applies an orthogonal transformation to image data corresponding to a still image to obtain orthogonal transformation coefficients expressed as bit sequences. The bit separation processor separates each bit sequence to a higher-rank bit sequence and a lower-rank bit sequence to obtain a higher-rank orthogonal transformation coefficient and a lower-rank orthogonal transformation coefficient. The grouping processor utilizes a group table to obtain zero run lengths, group numbers and added bits of the higher-rank orthogonal transformation coefficients. The encoding processor utilizes a Huffman table to determine a codeword corresponding to each of the zero run lengths and the group numbers, and combines the added bits and the codeword to generate compressed image data. The decoding processor utilizes the Huffman table to obtain the zero run lengths and the group numbers corresponding to the codewords from the compressed data. The inverse grouping processor utilizes the group table to reproduce the higher-rank orthogonal transformation coefficients, based on the zero run lengths, the group numbers and the added bits. The bit synthesis processor synthesizes the higher-rank bit sequence reproduced from the reproduced higher-rank orthogonal transformation coefficients and the lower-rank bit sequence reproduced by removing the additional negative-sign bit or additional positive-sign bit from the sign-included lower-rank orthogonal transformation coefficients to obtain the orthogonal transformation coefficients expressed as the bit sequences. The inverse orthogonal transformation processor applies an inverse orthogonal transformation to the reproduced orthogonal transformation coefficients to obtain the image data corresponding to the still image.

An image expansion device according to the present invention comprises a decoding processor, a bit synthesis processor, and an inverse orthogonal transformation processor, which expands compressed image data composed of first data and second data. The first data are, for example, generated by an orthogonal transformation, a bit separation processing and an entropy encoding, and correspond to higher-rank orthogonal transformation coefficients. The second data, expressed as lower-rank bit sequences, are, for example, generated by the bit separation processing, and correspond to lower-rank orthogonal transformation coefficients.

The decoding processor decodes the first data by an entropy decoding process to obtain the higher-rank orthogonal transformation coefficients expressed as higher-rank bit sequences. The bit synthesis processor synthesizes the higher-rank bit sequence of each of the higher-rank orthogonal transformation coefficients and the lower-rank bit sequence of the corresponding second data to obtain orthogonal transformation coefficients. The inverse orthogonal transformation processor applies an inverse orthogonal transformation to the orthogonal transformation coefficients to obtain image data corresponding to a still image.

BRIEF DESCRIPTION OF THE DRAWINGS

The present invention will be better understood from the description of the preferred embodiments of the invention set forth below together with the accompanying drawings, in which:

FIG. 6 is a view showing group tables.

FIG. 7 is a view showing a Huffman-encoding process.

FIG. 8 is a view showing a Huffman table.

FIG. 12 is a view showing an example of a matrix arrangement of pixel values, a matrix arrangement of DCT coefficients, the matrix arrangement of quantized DCT coefficients, and a quantization table.

DESCRIPTION OF THE PREFERRED EMBODIMENTS

Hereinafter, the preferred embodiments of the present invention are described with reference to the attached drawings.

Figure 1:
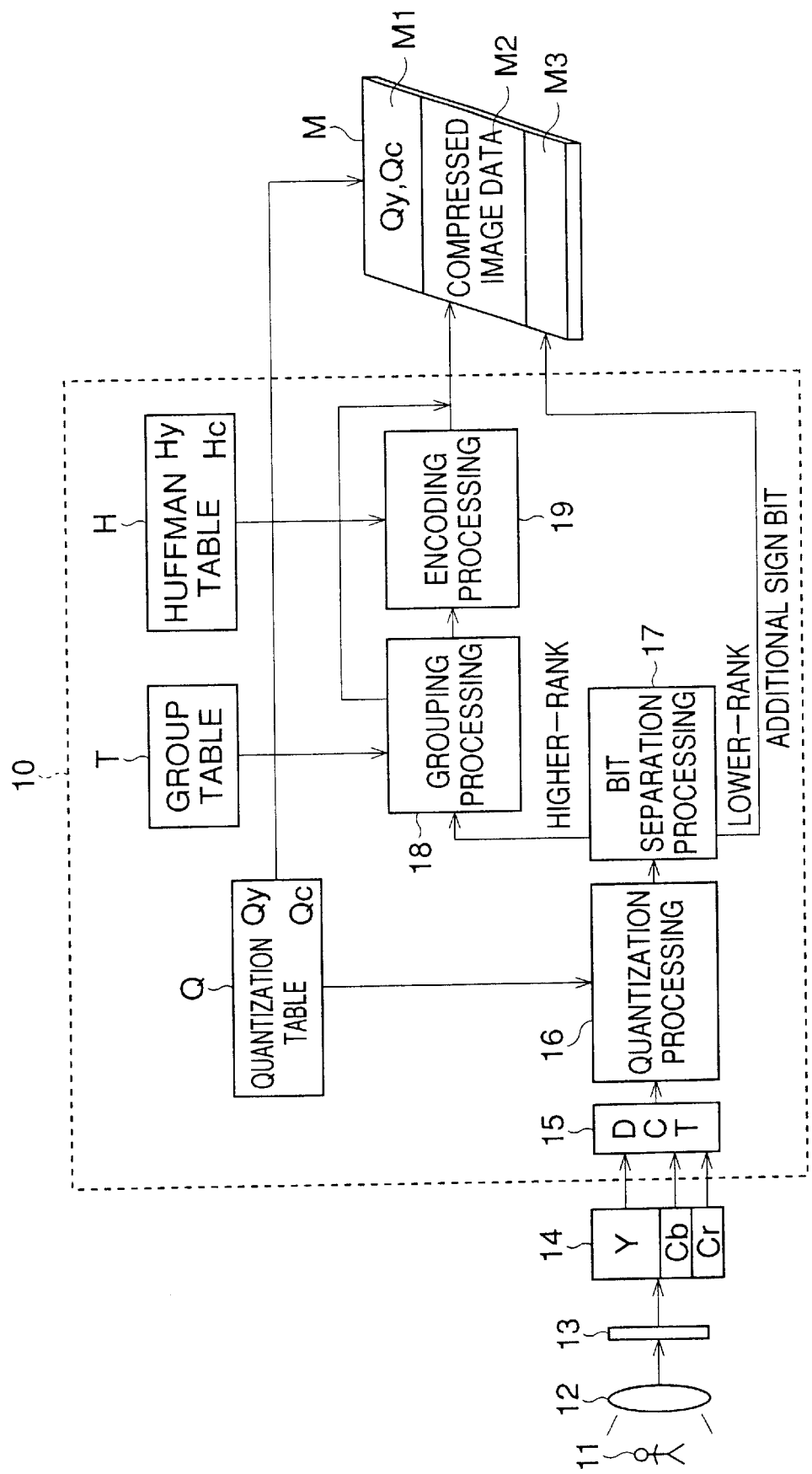
FIG. 1 is a block diagram showing an image compression device of a first embodiment of the present invention.

FIG. 1 is a block diagram of an image compression device of a first embodiment of the present invention.

Light reflected from a subject 11 is focused on a CCD (charge-coupled-device) 13 via a lens 12. Photoelectric conversion devices (not shown) are disposed on the CCD 13, and red (R), green (G) and blue (B) color filter elements (not shown) are provided in front of the photoelectric conversion devices. Each photoelectric conversion device corresponds to a single image-pixel data. The subject image focused on the CCD 13 is converted into electrical signals corresponding to predetermined colors by the photoelectric conversion elements, and these analog signals are then input to an A/D converter (not shown). The analog image-pixel signal is converted to a digital image-pixel signal in the A/D converter.

The digital image-pixel signal is input to a signal processing circuit (not shown), and is then converted into luminance data Y and color difference data Cb,Cr. The luminance data Y and the color difference data Cb,Cr are recorded in an image memory 14. The image memory 14 is divided into mutually independent memory areas for storing the luminance data Y and the color difference data Cb, Cr separately. Each memory area has a storage capacity of one frame's worth of image-pixels.

The luminance data Y and the color difference data Cb,Cr are read out from the image memory 14 and are input to a compression device 10. The compression device 10 comprises a discrete cosine transformation (DCT) processing circuit 15, a quantization processing circuit 16, a bit separation processing circuit 17, a grouping processing circuit 18, and an encoding processing circuit 19. The luminance data Y and the color difference data Cb,Cr are thus respectively compressed in the compression device 10.

In the DCT processing circuit 15, the luminance data Y are subjected to a two-dimensional discrete cosine transformation (two-dimensional DCT), so as to produce luminance DCT coefficients for each spatial frequency. In this embodiment, the DCT is utilized as an orthogonal transformation, so a DCT coefficient is an orthogonal transformation coefficient.

The DCT coefficients of the luminance data Y are input to the quantization processing circuit 16. In the quantization processing circuit 16, the DCT coefficients of the luminance data Y are quantized by using a quantization table Q, so that quantized luminance DCT coefficients are obtained. The quantized DCT coefficients of the luminance data Y are then input to the bit separation processing circuit 17. Note that a quantization table Qy is used as the quantization table Q for the luminance data Y.

The luminance data Y is expressed as a bit sequence in the compression device 10, and the quantized DCT coefficients of the luminance data Y are also expressed as bit sequences. In the bit separation processing circuit 17, a bit sequence of a quantized DCT coefficient is subjected to a bit separation processing, as described later. The bit sequence of the quantized DCT coefficient is separated into a higher-rank bit sequence and a lower-rank bit sequence, so that a higher-rank quantized DCT coefficient and lower-rank quantized DCT coefficient are obtained for each quantized DCT coefficient.

The lower-rank bit sequence, corresponding to the lower-rank quantized DCT coefficient, has an additional sign bit added, so that a sign-included lower-rank quantized DCT coefficient is obtained. Each sign-included lower-rank quantized DCT coefficient is then stored in a recording area M3 of a recording medium M, with no compression.

In the grouping processing circuit 18, each higher-rank quantized DCT coefficient is grouped in accordance with a group table T, so that a group number, added bits, and a zero run length are obtained.

In the encoding processing circuit 19, a Huffman codeword for each higher-rank quantized DCT coefficient is generated by a Huffman table H, based on corresponding group numbers and zero run lengths. Compressed image data is then generated by combining the Huffman codeword and the added bits, and the compressed image data is then recorded in a recording area M2 of the recording medium M. A Huffman table Hy is used as the Huffman table H for the luminance data Y.

Namely, in the grouping processing circuit 18 and the encoding processing circuit 19, the higher-rank quantized DCT coefficients are subjected to Huffman-encoding. The Huffman encoding is an entropy encoding.

In the same way, the color difference data Cb,Cr are converted to DCT coefficients in the DCT processing circuit 15, which are then quantized by using a quantization table Qc in the quantization processing circuit 16, so as to produce quantized DCT coefficients of the color difference data Cb,Cr. Thereafter, the quantized DCT coefficients of the color difference data Cb,Cr are subjected to the bit separation processing in the bit separation processing circuit 17, so that higher-rank quantized DCT coefficients and lower-rank quantized DCT coefficients are obtained for each color difference data Cb,Cr. The higher-rank quantized DCT coefficients of the color difference data Cb,Cr are grouped in the grouping processing circuit 18, and are then Huffman-encoded by using a Huffman table Hc in the encoding processing circuit 19. The quantization tables Qy and Qc are recorded in the recording area M1 of the recording medium M, and the compressed Cb,Cr image data are stored with the compressed Y image data in the recording area M2.

One frame's worth of the luminance data Y is divided into a plurality of blocks and each block is separately processed. Note that each of the blocks is composed of pixel data arranged in an 8×8 matrix. The color difference data Cb,Cr are also processed in a similar manner.

Figure 2:
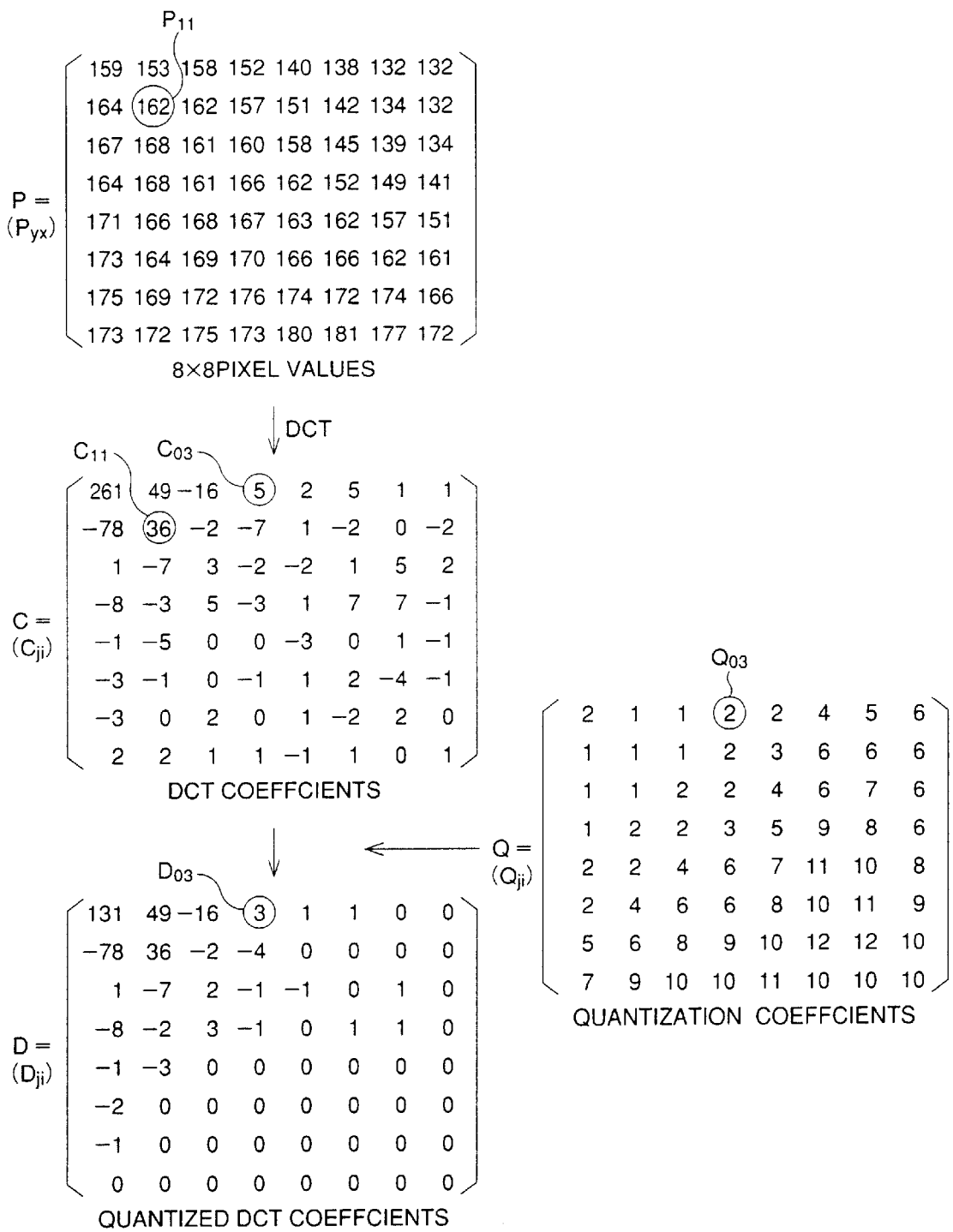
FIG. 2 is a view showing an example of a matrix arrangement of pixel values, a matrix arrangement of DCT coefficients, a matrix arrangement of quantized DCT coefficients, and a quantization table.

FIG. 2 shows, as an example, a pixel block P, a DCT coefficient matrix C, a quantized DCT coefficient matrix D, and the quantization table Q. The pixel block P is composed of pixel values $P_{yx}$, the DCT coefficient matrix C is composed of DCT coefficients $C_{ji}$, the quantized DCT coefficient matrix D is composed of quantized DCT coefficients $D_{ji}$, and the quantization table Q is composed of quantization coefficients $Q_{ji}$. In this example, the pixel values $P_{yx}$ correspond to the luminance data Y.

A suffix "y" of the pixel values $P_{yx}$ indicates a vertical position in the 8×8 pixel block. Values of "y" (0, 1, 2, . . . 7) ascend from an upper-position to a lower-position. A suffix "x" indicates a horizontal position in the 8×8 pixel block. Values of "x" (0, 1, 2, . . . 7) ascend from a left-position to a right-position. For example,in a case of "x"=1,"y"=1, a pixel value $P_{11}$, is "162".

Suffixes "j" and "i" of $C_{ji}$, $D_{ji}$, and $Q_{ji}$ correspond to vertical and horizontal positions, respectively, of the respective 8×8 matrixes (C, D, and Q). Values of "j" (0, 1, 2, . . . 7) ascend from an upper-position to a lower-position, and values of "i" (0, 1, 2 . . . 7) ascend from a left-position to a right-position. For example, in a case of "j"=1, "1", a DCT coefficient $C_{11}$ is "36".

The pixel values $P_{yx}$ are converted to 64 (8×8) DCT coefficients $C_{ji}$ by the two-dimensional DCT. Of the DCT coefficient matrix C, the DCT coefficient $C_{00}$ at position (0,0) is a DC (Direct Current) component, while remaining 63 DCT coefficients $C_{ji}$ are AC (Alternating Current) components. The AC components show how many higher spatial frequency components there are in the 8×8 pixel block from DCT coefficient $C_{01}$ or $C_{10}$ to DCT coefficient $C_{77}$. The DC component shows an average value of the spatial frequency components of the 8×8 pixel block as a whole.

The DCT coefficients $C_{ji}$ are quantized by the quantization coefficients $Q_{ji}$, so that the quantized DCT coefficients $D_{ji}$ are obtained. The quantization table Q is composed of the quantization coefficients $Q_{ji}$. In this embodiment, a quantization is a linear quantization; that is, the DCT coefficients $C_{ji}$ are divided by the corresponding quantization coefficients $Q_{ji}$, and are then rounded up or down. Rounding is an approximation function, which approximates, to a nearest integer, a value of the argument. For example, the quantized DCT coefficient $D_{03}$ (=3) is obtained, by dividing DCT coefficient $C_{03}$ (=5) by quantization coefficient $Q_{03}$ (=2) and rounding up.

In this embodiment, the quantization table Q is not a default quantization table, which is used in a conventional compression device, and a value of each quantization coefficient $Q_{ji}$ is small in comparison with that of the conventional default quantization table.

Figure 3:
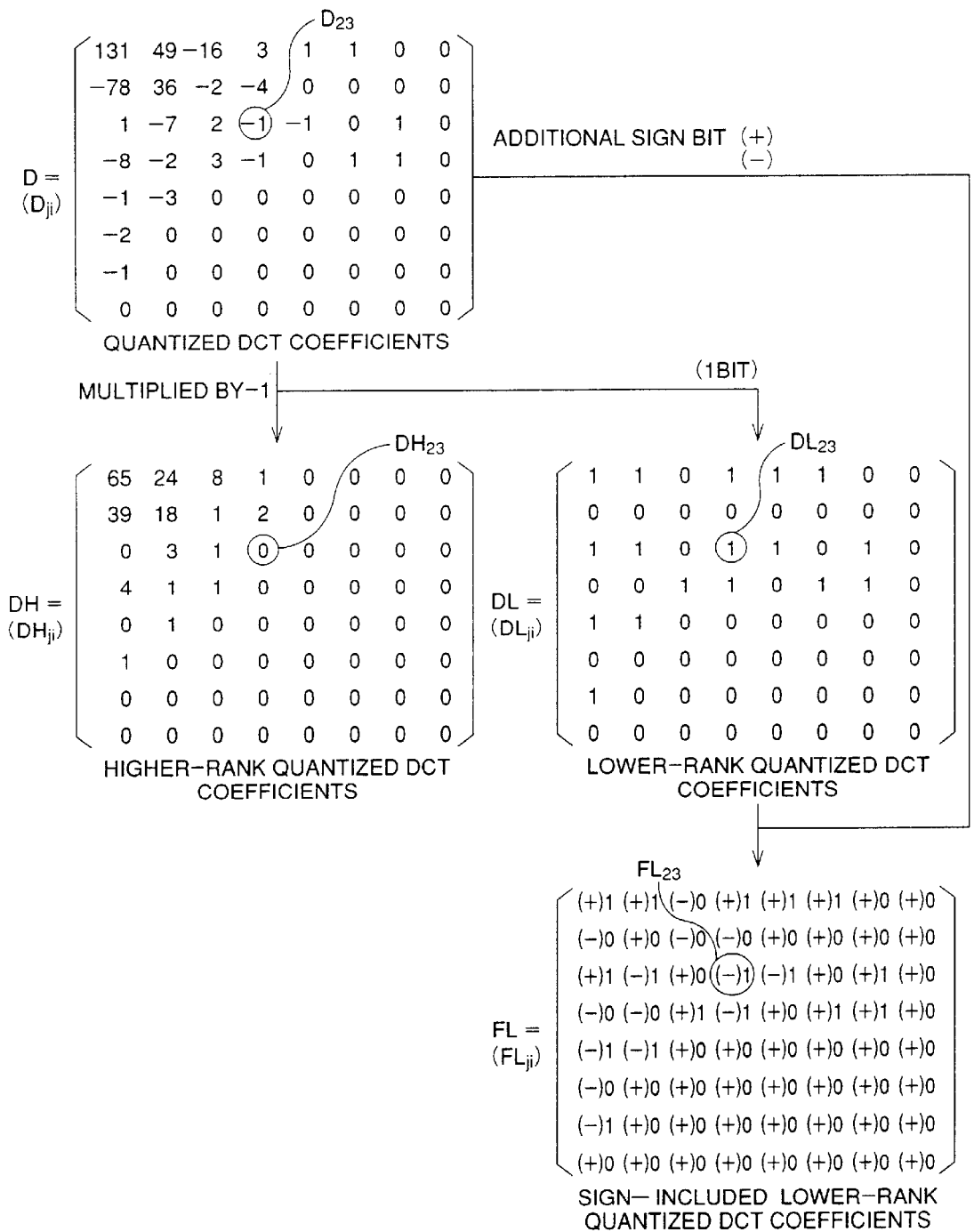
FIG. 3 is a view showing an example of the matrix arrangement of the quantized DCT coefficients in FIG. 2, a matrix arrangement of higher-rank quantized DCT coefficients, a matrix arrangement of lower-rank quantized DCT coefficients, and a matrix arrangement of sign-included lower-rank quantized DCT coefficients.

FIG. 3 shows the quantized DCT coefficient matrix D, a higher-rank quantized DCT coefficient matrix DH, a lower-rank quantized DCT coefficient matrix DL, and a sign-included lower-rank quantized DCT coefficient matrix FL The quantized DCT coefficient matrix D is composed of the quantized DCT coefficients $D_{ji}$, the higher-rank quantized DCT coefficient matrix DH is composed of higher-rank quantized DCT coefficients $DH_{ji}$, the lower-rank quantized DCT coefficient matrix DL is composed of lower-rank quantized DCT coefficients $DL_{ji}$, and the sign-included lower-rank quantized DCT coefficient matrix FL is composed of sign-included lower-rank quantized DCT coefficients $FL_{ji}$.

Each of the quantized DCT coefficients $D_{ji}$ is separated into a corresponding higher-rank quantized DCT coefficient $DH_{ji}$ and a corresponding lower-rank quantized DCT coefficient $DL_{ji}$ by the bit separation processing in the bit separation processing circuit 17 (FIG. 1) . Namely, a bit sequence of each of the quantized DCT coefficients $D_{ji}$ is separated into a higher-rank bit sequence and a lower-rank bit sequence, so that the corresponding higher-rank quantized DCT coefficient $DH_{ji}$, corresponding to the higher-rank bit sequence, and the corresponding lower-rank quantized DCT coefficient $DL_{ji}$, corresponding to the lower-rank bit sequence, are obtained. At this time, the quantized DCT coefficients $D_{ji}$, the values of which are positive, are directly subjected to the bit separation processing. Conversely, the quantized DCT coefficients $D_{ji}$, the values of which are negative, are multiplied by −1 before the bit separation processing; that is, a "minus" sign of the quantized DCT coefficients $D_{ji}$ is converted to a "plus" sign. Then, these quantized DCT coefficients $D_{ji}$ are subjected to the bit separation processing. For example, a negative quantized DCT coefficient $D_{23}$ (=−1) is first multiplied by −1 and is then subjected to the bit separation processing, so that a higher-rank quantized DCT coefficient $DH_{23}$ (=0) and a lower-rank quantized DCT coefficient $DL_{23}$ (=1) are obtained. In FIG. 3, a bit number of the lower-rank bit sequence is one bit.

As shown in FIG. 3, a value of each higher-rank quantized DCT coefficient $DH_{ji}$ is smaller than a corresponding quantized DCT coefficient $D_{ji}$. Further, a total number of values being "0" in the higher-rank quantized DCT coefficient matrix DH, is large, in comparison with the quantized DCT coefficient matrix D.

Thereafter, the additional sign bit is added to the bit sequences of the lower-rank quantized DCT coefficients $DL_{ji}$; that is, the lower-rank bit sequence. When the positive quantized DCT coefficients $D_{ji}$ are subjected to the bit separation processing, a "plus" additional sign bit (+) is added to the corresponding lower-rank bit sequences. When the negative quantized DCT coefficients $D_{ji}$ are subjected to the bit separation processing, a "minus" additional sign bit (−) is added to the corresponding lower-rank bit sequences.

For example, when the quantized DCT coefficient $D_{23}$ (=−1) is subjected to the bit separation processing, a "minus" additional sign bit (−) is added to the lower-rank bit sequence of the lower-rank quantized DCT coefficient $DL_{23}$ (=1), so that a sign-included lower-rank quantized DCT coefficient $FL_{23}$ (=(−)1) is obtained. Note that the equation "$FL_{23}$=(−)1" does not indicate that an actual value of the sign-included lower-rank quantized DCT coefficient $FL_{23}$ is −1.

In this embodiment, a bit number of the lower-rank bit sequences, which is separate from the bit sequences of the quantized DCT coefficients $D_{ji}$, is "n" (n=1, 2, . . . ) bits. One bit is regarded as a bit sequence.

Figure 4:
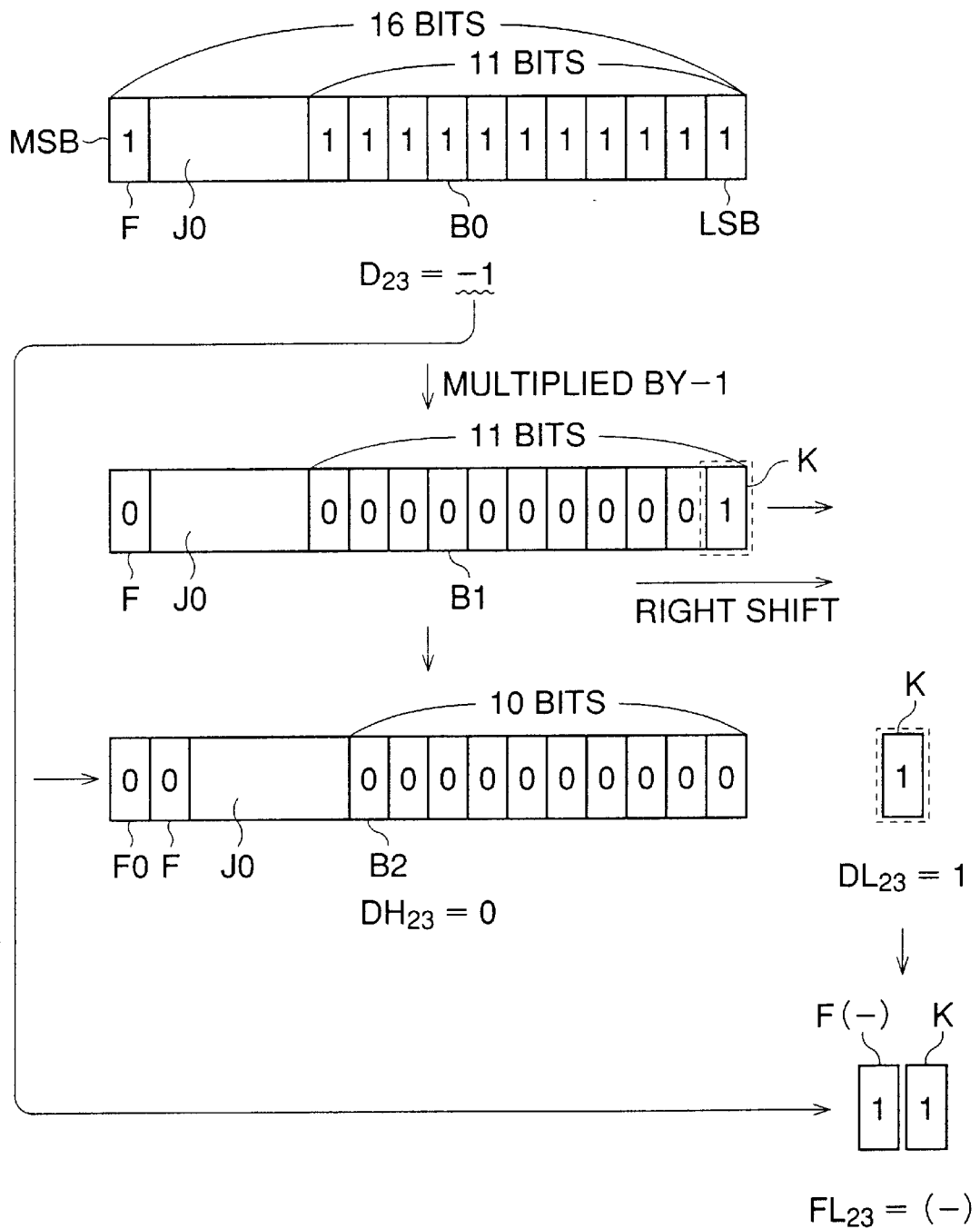
FIG. 4 is a view showing a bit separation process of a quantized DCT coefficient.

FIG. 4 shows, as an example, a bit separation processing of the quantized DCT coefficient $D_{23}$ (=−1) in FIG. 3, which is part of the AC component. Generally, 16 bits are used to express a binary number of each quantized DCT coefficient $D_{ji}$, however, in this embodiment, the values of the quantized DCT coefficients $D_{ji}$ are expressed using 12 bits. Within the 12 bits, one bit is utilized as a sign bit. Note that, in FIG. 4, as an example, a 1 bit separation processing is shown.

As shown in FIG. 4, the quantized DCT coefficient $D_{23}$ (=−1) is represented by the 11 bit binary number "11111111111", and the sign bit F is "1", which indicates a negative. In the bit sequence B0, 11 bits from a right end LSB (Least Significant Bit) are used to express the binary number "11111111111", and a MSB (Most Significant Bit) within the 16 bits is used to represent the sign bit F. Remaining 4 bits J0 are represented by binary number "1111".

The value of quantized DCT coefficient $D_{23}$ (=−1) is converted to a value of 1, by multiplying by −1, so that the bit sequence B0 is converted to a manipulated bit sequence B1. In the manipulated bit sequence B1, the quantized DCT coefficient $D_{23}$ is now represented by the binary number "00000000001", and the sign bit F is "0", which indicates a positive. The remaining 4 bits J0 are now represented by binary number "0000".

The manipulated bit sequence B1 is subjected to a right shift processing. The shift processing is an arithmetic shift, which moves a bit pattern in the bit sequence right or left. In the case of a right shift processing of 1 bit, a bit pattern in the bit sequence is shifted right by 1 bit worth, so that the least significant bit (LSB) K is separated; that is, the bit K is shifted off the end of the bit sequence B1. Then, a sign bit F0, which is represented by "0", is assigned to a leading bit position (MSB) in the manipulated bit sequence B1, which is a blank position due to the 1 bit right shift processing. Consequently, the manipulated bit sequence B1 is converted to a bit sequence B2, in which a binary number of 10 bits "0000000000" is represented. This bit sequence B2 is the higher-rank bit sequence, and a value of the binary number "0000000000" is 0 in decimal notation. Namely, a value of a higher-rank quantized DCT coefficient $DH_{23}$ is 0.

On the other hand, the LSB K, which is separated from the bit sequence B1 by the 1 bit right shift processing, represents the lower-rank bit sequence. Since a value of the binary number "1" is 1 in decimal notation, a value of a lower-rank quantized DCT coefficient $DL_{23}$ is 1.

As the value of the quantized DCT coefficient $DH_{23}$ (=−1) is negative, a "minus" additional sign bit F(−) is added to the lower-rank bit sequence K, such that the sign-included lower-rank quantized DCT coefficient $FL_{23}$ (=(−)1) is obtained. The "minus" additional sign bit F(−) is represented by the binary number "1", which indicates a negative.

As described above, the bit sequence B0 of the quantized DCT coefficient $D_{23}$ (=−1) is subjected to the 1 bit right shift processing, such that the higher-rank bit sequence B2 of the higher-rank quantized DCT coefficient $DH_{23}$ (=0) and the lower-rank bit sequence K of the lower-rank quantized DCT coefficient $DL_{23}$ (=1) are obtained. Then, the additional sign bit F(−) is added to the lower-rank bit sequence K, so that the sign-included lower-rank quantized DCT coefficient $FL_{23}$ (=(−)1) is obtained.

When a positive quantized DCT coefficient $D_{ji}$, for example, $D_{03}$ (shown in FIG. 3), is subjected to the 1 bit right shift processing, a "plus" additional sign bit F(+) is added to a respective lower-rank bit sequence. The additional sign bit F(+) is represented by binary number "0", which indicates a positive.

As described above, the bit separation processing separates the bit sequences of the quantized DCT coefficients $D_{ji}$ into higher-rank bit sequences and lower-rank bit sequences, by using the 1 bit right shift processing, such that higher-rank quantized DCT coefficients $DH_{ji}$ and lower-rank quantized DCT coefficients $DL_{ji}$ are obtained. Then, a "minus" additional sign bit F(−) or a "plus" additional sign bit F(+) is added to a respective lower-rank bit sequence, so that sign-included lower-rank quantized DCT coefficients $FL_{ji}$ are obtained.

The DC component (the quantized DCT coefficient $D_{00}$) is also subjected to the 1 bit right shift processing, similarly to the AC component of the quantized DCT coefficients $D_{ji}$.

When an "n" (n=1, 2 . . . ) bit right shift processing is executed, a bit pattern in the bit sequence is shifted right by "n" bits worth, so that "n" bits from the right end (LSB), within the 16 bits, are separated from the bit sequence leaving an "n" bits blank position available "n" bits from the left end (MSB). Then, a corresponding number of positive sign bits, a bit number of which is "n", are assigned to the available blank position "n" bits from the left end (MSB) in the bit sequence. In this embodiment, a bit number of the right shift processing depends on a kind of still image to be compressed. For example, when a specific still image is most efficiently compressed by a 2 bit right shift processing, a 2 bit right shift processing is executed. Note that a bit number "n" can be manually selected by operating a switch (not shown in FIG. 1)

Figure 5:
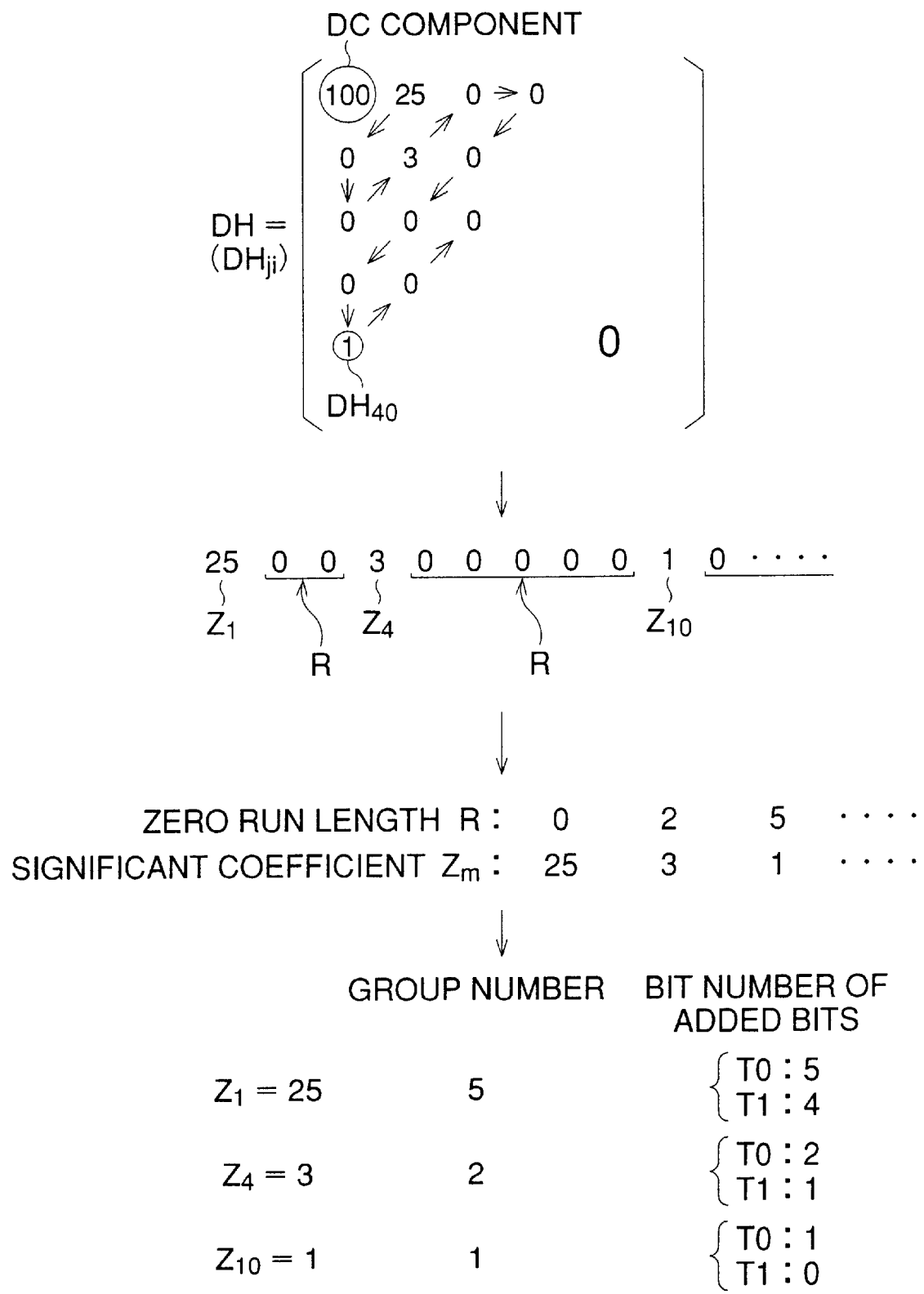
FIG. 5 is a view showing a Huffman-encoding process.

FIGS. 5 to 8 show a Huffman-encoding processing. A quantized DCT coefficient matrix DH, shown in FIG. 5, is different from the quantized DCT coefficient matrix DH, shown in FIG. 3, for ease of understanding.

The encoding methods are different for the quantized DCT coefficient $D_{00}$ of the DC component and the quantized DCT coefficients $D_{ji}$ of the AC component.

The quantized DCT coefficient $D_{00}$, which is the DC component, is encoded by using a DC component group table (not shown) and a Huffman-encoding table (not shown), which are recommended by the JPEG and are well-known in the art.

The encoding method of the quantized DCT coefficients $D_{ji}$ of the AC component is performed as follows:

Firstly, the 63 AC component quantized DCT coefficients $D_{ji}$ are zigzag scanned along an arrow direction, as shown in FIG. 5, and are rearranged into a one-dimensional array. In the one-dimensional array "(25,0,0,3,0,0,0,0,0,1,0, . . . )", the AC component quantized DCT coefficients $D_{ji}$, the values of which are not 0, , are identified as significant coefficients $Z_m$. For example, a quantized DCT coefficient $DH_{40}$ (=1) is identified as a significant coefficient $Z_{10}$ (=1). A suffix "m" indicates an order in the one-dimensional array. On the other hand, a number of consecutive AC component quantized DCT coefficients $D_{ji}$, which equal 0, are counted in the one-dimensional array. From this, a length of consecutive "0"s, that is, a zero run length R, is obtained. For example, since two "0"s are arranged between a significant coefficient $Z_1$ (=25) and a significant coefficient $Z_4$ (=3), the specific zero run length R is "2".

The group table T1, shown in FIG. 6, has a column showing a group number C, a column showing a bit number of added bits, and a column showing the significant coefficients $Z_m$.

With regards to a significant coefficient Zm, the group table T1 is referenced to obtain a corresponding group number C and added bits. A group, in which a specific significant coefficient $Z_m$ belongs to, is determined by a value of the specific significant coefficient $Z_m$. For example, a group number C of significant coefficient $Z_1$ (=25) is "5". Further, added bits are obtained, based on an order of a significant coefficient Zm within the group number C. For example, since the significant coefficient $Z_1$ (=25) is ninth from a smallest figure (=16) in group "5" of the group number C (=5), and the bit number of the added bits is "4", then added bits are "1001". In a case of significant coefficient $Z_{10}$ (=1), a group number C is "1", and a bit number of added bits is "0". Therefore, regarding group "1" of the group number C (=1), no added bits should be needed.

On the other hand, a group table T0, also shown in FIG. 6, is recommended by the JPEG. For example, regarding significant coefficient $Z_1$ (=25), a group number C is "5", and a bit number of added bits is "5", so that added bits "11001" are obtained.

FIG. 7 shows added bits, Huffman codewords, and Huffman-encoded data. FIG. 8 shows the Huffman table H recommended by the JPEG. The Huffman table H has a column showing zero run length R and group number C, a column showing Huffman codewords, and a column showing bit numbers of corresponding Huffman codewords.

Based on a group number C and a zero run length R corresponding to a significant coefficient $Z_m$ and obtained from the group table T1, a codeword is obtained by referring to the Huffman table H, shown in FIG. 8. For example, when a zero run length R is "0" and a group number C is "5" (the zero run length R/the group number C="0/5"), a codeword is "1101" according to the Huffman table H. Then, Huffman-encoded data of the significant coefficient $Z_1$ (=25) is obtained by combining the codeword "11010" and the previously obtained added bits "1001", that is, the Huffman-encoded data of the significant coefficient $Z_1$ (=25) is "110101001". Similarly, regarding significant coefficient $Z_4$ (=3) and significant coefficient $Z_{10}$ (=1), the Huffman-encoded data "111110011" and "1111010" are obtained, respectively. Significant coefficients $Z_m$ are Huffman-encoded in order, so that Huffman-encoded data (HEB) is obtained as shown in FIG. 7.

On the other hand, when the group table T0 is used for obtaining Huffman-encoded data, the Huffman-encoded data is obtained as shown in FIG. 7. For example, regarding the significant coefficient $Z_1$ (=25), the group number "5", the added bits "11001", and zero run length "0" are determined according to the group table T0, so that Huffman-encoded data "1101011001" are obtained. A bit number of this Huffman-encoded data "1101011001" is larger than that of the Huffman-encoded data "110101001", which is obtained by using the group table T1. Therefore, a total bit number of the Huffman-encoded data obtained by the group table T1 is smaller than that of the Huffman-encoded data obtained by the group table T0. Namely, an amount of compressed image data decreases by using the group table T1.

Figure 9:
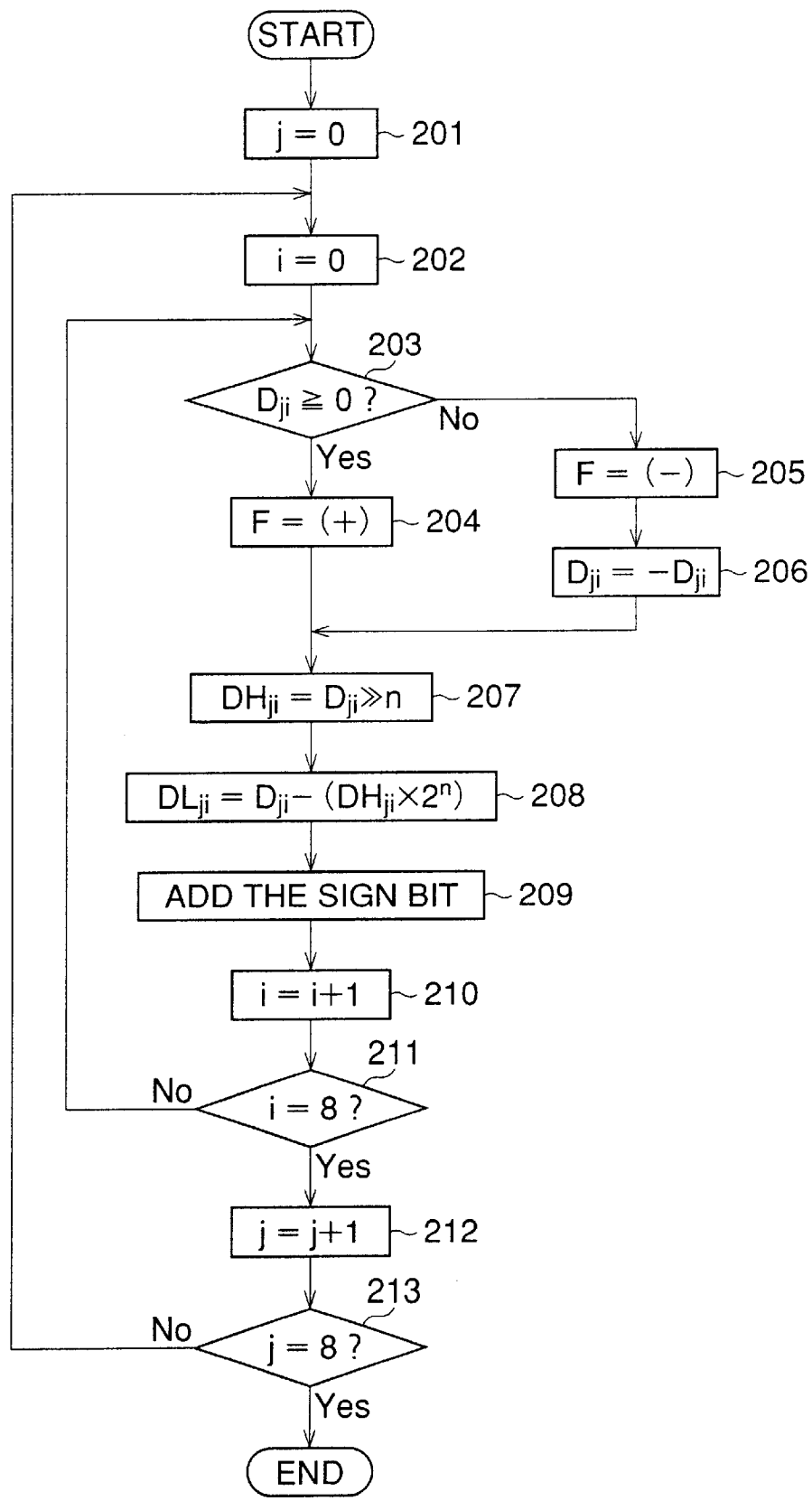
FIG. 9 is a flowchart showing a bit separation process routine.

FIG. 9 is a flowchart showing the bit separation processing of the bit separation circuit in FIG. 1.

In Step 201, the suffix "j" is set to 0. In Step 202, the suffix "i" is set to 0, such that quantized DCT coefficients $D_{j0}$, which are arranged in the left-most column in the quantized DCT coefficient matrix D, is subjected to the bit separation processing first. Initially, for example, the quantized DCT coefficient $D_{00}$ (=131 in FIG. 3) is subjected to the bit separation processing.

In Step 203, it is determined whether a value of the quantized DCT coefficient $D_{ji}$ is greater than or equal to 0. When the value of the quantized DCT coefficient $D_{ji}$ is greater than or equal to 0, Step 204 is executed, so that the additional sign bit is set to a positive sign bit F(+). When a value of the quantized DCT coefficient $D_{ji}$ is less than 0, Step 205 is executed. In Step 205, the additional sign bit is set to a negative sign bit F(−). Then, the quantized DCT coefficient $D_{ji}$ is multiplied by −1 in Step 206, so that the value of the quantized DCT coefficient $D_i$ is converted to a positive value.

In Step 207, the quantized DCT coefficient $D_{ji}$ is subjected to an n-bit right shift processing, such that the higher-rank quantized DCT coefficient $DH_{ji}$ is obtained. For example, when the bit separation of 1 bit is executed, the quantized DCT coefficient $D_{23}$ (=−1) is multiplied by −1, and is subjected to the 1 bit right shift processing, so that the higher-rank quantized DCT coefficient $DH_{23}$ (=0) is obtained. Further, when a 3 bit separation is executed, the quantized DCT coefficient $D_{23}$ (=−1) is multiplied by −1, and is subjected to a 3 bit right shift processing, so that higher-rank quantized DCT coefficient $DH_{23}$ (=0) is obtained.

In Step 208, the lower-rank quantized DCT coefficient $DL_{ji}$ is obtained by a following equation:

$$DL_{ji}=D_{ji}-(DH_{ji}\times 2^n)$$

For example, when the bit separation of 1 bit is executed, the lower-rank quantized DCT coefficient $DL_{23}$ is obtained:

$$DL_{23}=1-(0\times 2^1)=1$$

Further, when the bit separation of 3 bit s is executed, a lower-rank quantized DCT coefficient $DL_{23}$ is obtained:

$$DL_{23}=1-(0\times 2^3)=1$$

Note that the bit number "n" of the bit separation is manually pre-set.

In Step 209, the "plus" additional sign bit F(+) set in Step 204, or the "minus" additional sign bit F(−) set in Step 205, is added to the lower-rank quantized DCT coefficient $DL_{ji}$, so that the sign-included lower-rank quantized DCT coefficient $FL_{ji}$ is obtained. For example, the "minus" additional sign bit F(−) is added to the lower-rank quantized DCT coefficient $DL_{23}$ (=1), so that the sign-included lower-rank quantized DCT coefficient $FL_{23}$ (=(−)1) is obtained.

In Step 210, the suffix "i" is incremented by 1, In Step 211, it is determined whether the suffix "i" is equal to 8. When the suffix "i" is equal to 8, Step 212 is executed. Conversely, when the suffix "i" is not equal to 8, Step 203 is executed again, such that a quantized DCT coefficient $D_{ji+1}$ is subjected to the bit separation processing.

In Step 212, the suffix "j" is incremented by 1. In Step 213, it is determined whether the Suffix "j" is equal to 8. When the suffix "j" is equal to 8, the bit separation processing finishes. When the suffix "j" is not equal to 8, Step 202 is executed again, such that a next row of quantized DCT coefficients $D_{j+1i}$ subjected to the bit separation processing.

As described above, the quantized DCT coefficients $D_{ji}$ are subjected to the bit separation processing, such that higher-rank quantized DCT coefficients $DH_{ji}$ and lower-rank quantized DCT coefficients $DL_{ji}$ are obtained. Then, the higher-rank quantized DCT coefficients $DH_{ji}$ are Huffman-encoded, and the additional sign bits F(+) or F(−) are added to the lower-rank quantized DCT coefficients $DL_{ji}$ to obtain the sign-included lower-rank quantized DCT coefficients $FL_{ji}$.

The total bit number (length) of the Huffman-encoded data depends on the values of the significant coefficients $Z_m$, and the number of the zero run lengths R. In this embodiment, the higher-rank quantized DCT coefficients $DH_{ji}$ are Huffman-encoded in the absence of the quantized DCT coefficients $D_{ji}$, and, as shown in FIG. 3, a value of each higher-rank quantized DCT coefficient $DH_{ji}$ is small in comparison with a corresponding quantized DCT coefficient $D_{ji}$. Therefore, a bit number of added bits obtained from the significant coefficients $Z_m$ becomes small. Namely, a total bit number of compressed image data is decreased by the bit separation processing.

Since the sign-included lower-rank quantized DCT coefficients $FL_{ji}$ are directly stored in the recording area M3 with no compression, a total bit number of the image data, which is stored in the recording memory M, increases. However, the sign-included lower-rank quantized DCT coefficients ($FL_{ji}$) bit number is small in comparison with a bit number of the compressed data decreasing by performing the bit separation processing. Therefore, the sign-included lower-rank quantized DCT coefficients ($FL_{ji}$) bit number is negligible.

In the higher-rank quantized DCT coefficient matrix DH, there are multiple "0"s, in comparison with the quantized DCT coefficient matrix D. Therefore, many zero run lengths R are obtained in the one-dimensional array, enabling a bit number of the Huffman-encoded data to become small. Thus, the total bit number of the compressed image data decreases.

Further, when a value of a quantized DCT coefficient $D_{ji}$ is a negative, the quantized DCT coefficient $D_{ji}$ is multiplied by −1, such that a positive quantized DCT coefficient $D_{ji}$ is obtained. Consequently, the group table T1 can be used for encoding, and a bit number of added bits, obtained by using the group table T1, becomes small. Namely, again, the total bit number of the compressed image data decreases.

In this embodiment, the quantization table Q, which differs from the conventional default quantization table, is utilized for quantization. A value of each quantization coefficient $Q_{ji}$ is small, in comparison with a corresponding value in the default quantization table, and therefore, a round-off error becomes small, again being advantageous in reducing error in the compressed data.

Figure 10:
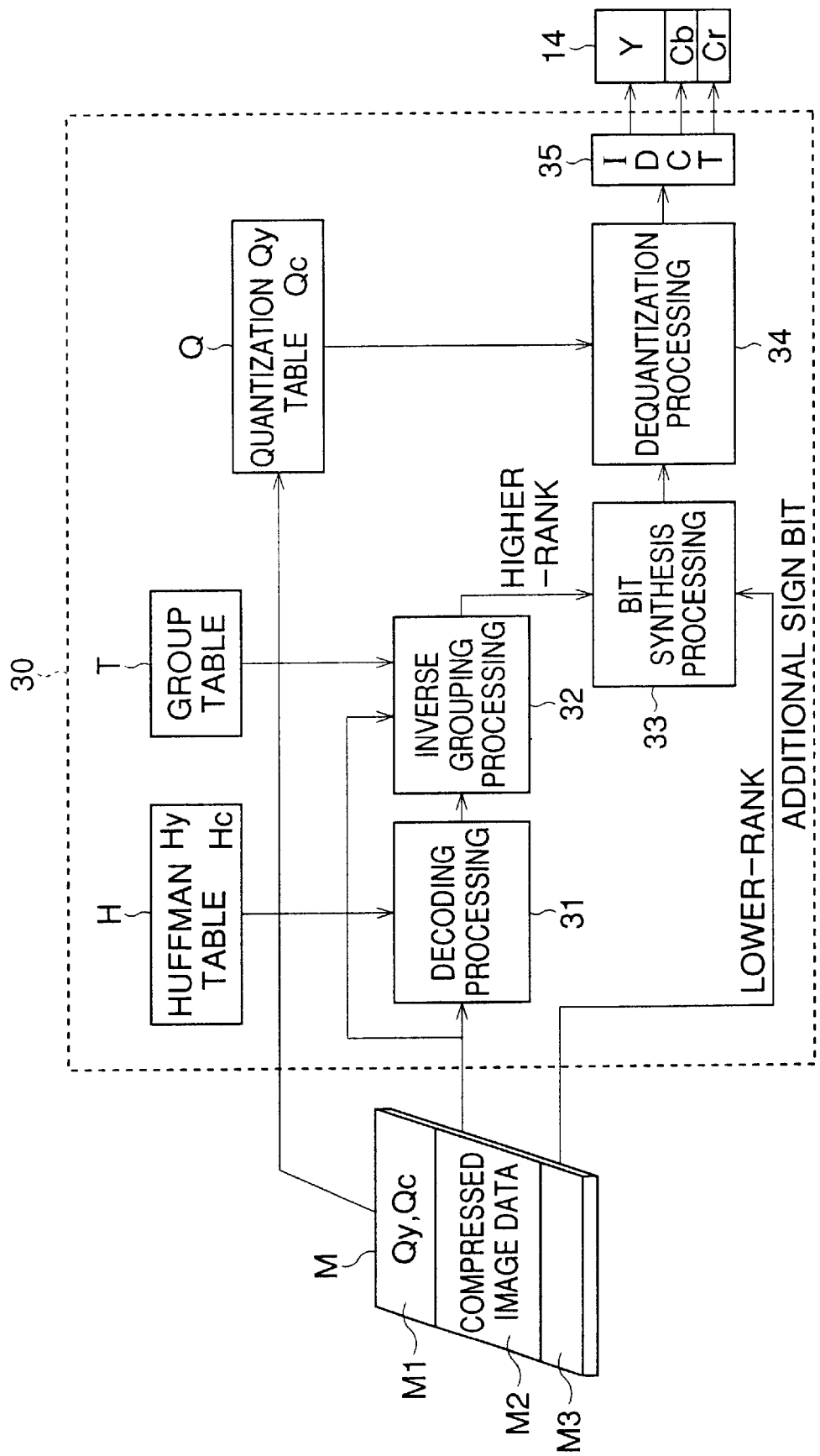
FIG. 10 is a block diagram showing an image expansion device of the first embodiment of the present invention.

FIG. 10 is a block diagram showing an image expansion device of a first embodiment of the present invention. This image expansion device expands compressed image data comprising luminance data Y and color difference data Cb,Cr, which are generated by the compression device 10 (shown in FIG. 1). Like references indicate identical components to those of the compression device 10.

The compressed image data, stored in the recording area M2 of the recording medium M, is read from the recording area M2 and input to an expansion device 30. The expansion device 30 comprises a decoding processing circuit 31, an inverse grouping circuit 32, a bit synthesis processing circuit 33, a dequantization processing circuit 34, and an inverse discrete cosine transformation (IDCT) processing circuit 35. The compressed luminance data Y and the corresponding color difference data Cb,Cr are expanded in the expansion device 30.

In the decoding processing circuit 31, the compressed luminance data Y are separated to the aforementioned added bits and Huffman codeword, and the Huffman table H is referenced to obtain the aforementioned zero run lengths R and group numbers C corresponding to the codewords. In the inverse grouping circuit 32, higher-rank quantized DCT coefficients are obtained, based on the zero run lengths R, the group numbers C, and the corresponding added bits. At this time, a group table T is utilized. This decoding process, that is, a Huffman-decoding, is an inverse of the encoding process (Huffman-encoding), and the decoded higher-rank quantized coefficients are identical to the higher-rank quantized DCT coefficients, which are generated in the bit separation processing circuit 17 in FIG. 1. The Huffman-decoding is an entropy decoding. Then, the decoded higher-rank quantized DCT coefficients are input to the bit synthesis processing circuit 33. On the other hand, sign-included lower-rank quantized DCT coefficients are read from the recording area M3 of the recording medium M, and are input to the bit synthesis processing circuit 33. Note that the group table T is identical to the group table T1 shown in FIG. 6.

In the bit synthesis processing circuit 33, the decoded higher-rank quantized DCT coefficients and sign-included lower-rank quantized DCT coefficients are subjected to a bit synthesis processing, as described later. Consequently, quantized DCT coefficients are generated. Then, In the dequantization processing circuit 34, the quantized DCT coefficients are dequantized using the appropriate quantization table Q (Qy,Qc), which is read from the recording area M1 of the recording medium M.

In the IDCT processing circuit 35, the DCT coefficients of the luminance data Y are subjected to an inverse discrete cosine transformation (IDCT) processing, such that the luminance data Y are reconstructed. This IDCT process is an inverse of the DCT process. The reproduced luminance data Y are then stored in the image memory 14.

In the same way, the compressed color difference data Cb,Cr are expanded, such that the color difference data Cb, Cr are reconstructed and stored in the image memory 14, respectively.

Figure 11:
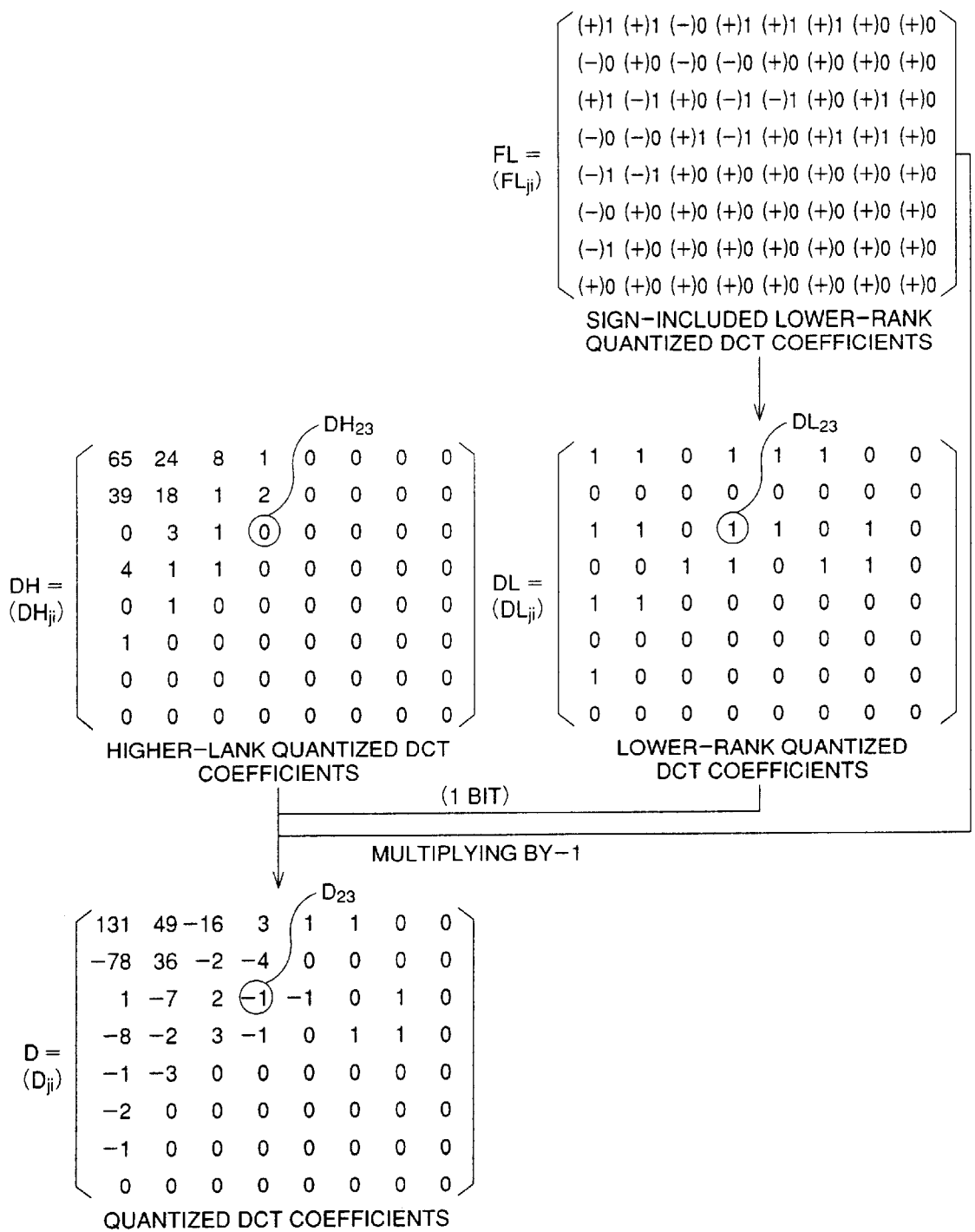
FIG. 11 is a view showing the matrix arrangement of the quantized DCT coefficients in FIG. 3, the matrix arrangement of higher-rank quantized DCT coefficients, the matrix arrangement of lower-rank quantized DCT coefficients, and the matrix arrangement of sign-included lower-rank quantized DCT coefficients.

FIG. 11 shows the sign-included lower-rank quantized DCT coefficient matrix FL of FIG. 3, the higher-rank quantized DCT coefficient matrix DH, the lower-rank quantized DCT coefficient matrix DL, and the quantized DCT coefficient matrix D. The sign-included lower-rank quantized DCT coefficient matrix FL is composed of the sign-included lower-rank quantized DCT coefficients $FL_{ji}$, the higher-rank quantized DCT coefficient matrix DH is composed of the higher-rank quantized DCT coefficients $DH_{ji}$, the lower-rank quantized DCT coefficient matrix DL is composed of the lower-rank quantized DCT coefficients $DL_{ji}$, and the quantized DCT coefficient matrix D is composed of the quantized DCT coefficients $D_{ji}$. Note that the sign-included lower-rank quantized DCT coefficients $FL_{ji}$, and the higher-rank quantized DCT coefficients $DH_{ji}$ are expressed as respective bit sequences. Further, note that the higher-rank quantized DCT coefficient matrix DH is obtained by matrix processing, which is an inverse of the zigzag scan shown in FIG. 5.

Each sign-included lower-rank quantized DCT coefficient $FL_{ji}$ has a "plus" additional sign bit (+), which indicates a positive, or a "minus" additional sign bit (−), which indicates a negative. When these additional sign bits are removed from the sign-included lower-rank quantized DCT coefficients $FL_{ji}$, the lower-rank quantized DCT coefficients $DL_{ji}$ are obtained. Then, a bit sequence of each of the higher-rank quantized DCT coefficients $DH_{ji}$ and a bit sequence of each of the lower-rank quantized DCT coefficients $DL_{ji}$ are subjected to a bit synthesis processing in the bit synthesis processing circuit 33, such that the quantized DCT coefficients $D_{ji}$ are obtained. When a lower-rank bit sequence is obtained by removing a "minus" additional sign bit (−) from a corresponding sign-included lower-rank quantized DCT coefficient $FL_{ji}$, that is, the sign-included lower-rank quantized DCT coefficient $FL_{ji}$ has a "minus" additional sign bit (−), the quantized DCT coefficient $D_{ji}$ obtained by the bit synthesis processing is multiplied by −1. Consequently, a positive value of the corresponding quantized DCT coefficient $D_i$ is converted to a negative value. On the other hand, when a sign-included lower-rank quantized DCT coefficient $FL_{ji}$ has a "plus" additional sign bit (+), a value of a corresponding quantized DCT coefficient $D_{ji}$ obtained by the bit synthesis processing is not converted to a negative.

For example, a higher-rank quantized DCT coefficient $DH_{23}$ (=0) and a lower-rank quantized DCT coefficient $DL_{23}$ (=1), which corresponds to a sign-included lower-rank quantized DCT coefficient $FL_{23}$ (=(−)1), are subjected to the bit synthesis processing, and is then multiplied by −1, so that the quantized DCT coefficient $D_{23}$ (=−1) is obtained. In FIG. 11, a bit number of the lower-rank quantized DCT coefficients $DL_{ji}$, that is, a number of the bit synthesis processing, is one bit.

FIG. 12 shows the quantized DCT coefficient matrix D, a DCT coefficient matrix C', the quantization table Q, and a pixel block P'. The quantized DCT coefficient matrix D is composed of the quantized DCT coefficients $D_{ji}$, and the quantization table Q is composed of the quantization coefficients $Q_{ji}$. The DCT coefficient matrix C' is composed of DCT coefficients $C'_{ji}$, and the pixel block P' is composed of reproduced pixel values $P'_{yx}$.

The quantized DCT coefficients $D_{ji}$ are dequantized, such that the DCT coefficients $C'_{ji}$ are obtained. Namely, the quantized DCT coefficients are multiplied by the corresponding quantization coefficients $Q_{ji}$. For example, a quantized DCT coefficient $D_{31}$ (=−2) is multiplied by a quantization coefficient $Q_{31}$ (=2), such that a DCT coefficient $C'_{31}$ (=−4) is obtained.

In this embodiment, since the value of each quantization coefficient $Q_{ji}$ is small, the rounding-off error is very small. Therefore, the original DCT coefficients $C_{ji}$ in FIG. 2 are almost equal to the corresponding reproduced DCT coefficients $C'_{ji}$.

Then, the DCT coefficients $C'_{ji}$ are subjected to the IDCT processing, so that pixel values $P'_{yx}$ are obtained, that is, an 8×8 pixel block P', corresponding to the 8×8 pixel block P in FIG. 2, is generated.

Figure 13:
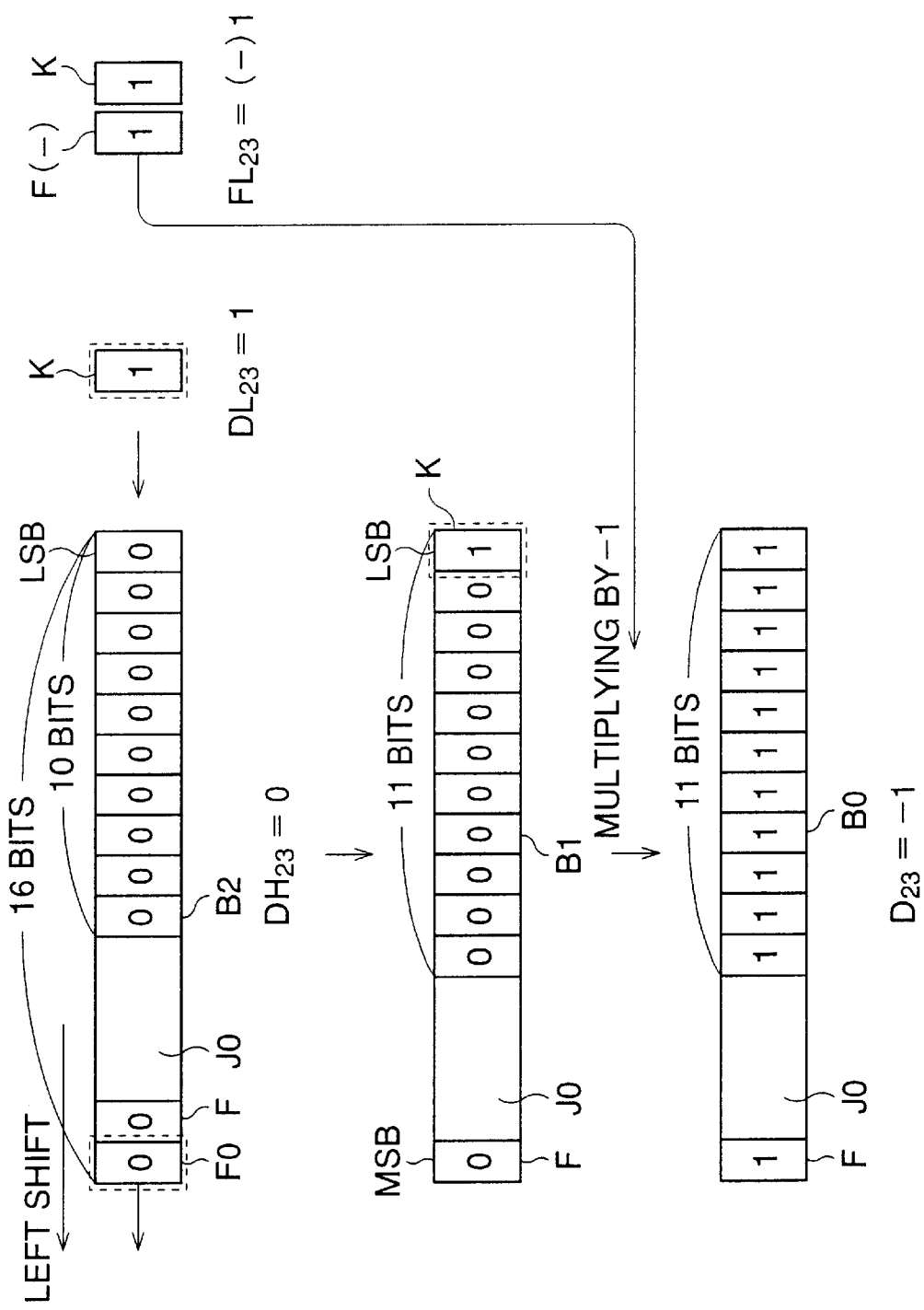
FIG. 13 is a view showing a bit synthesis process of a higher-rank quantized DCT coefficient and a corresponding lower-rank quantized DCT coefficient.

FIG. 13 shows, as an example, a bit synthesis processing of a higher-rank quantized DCT coefficient $DH_{23}$ (=0) in FIG. 11 and a lower-rank quantized DCT coefficient $DL_{23}$ (=1) in FIG. 11. Note that, in FIG. 13, a 1bit synthesis processing is shown to correspond to the 1 bit separation processing shown in FIG. 4. The lower-rank quantized DCT coefficient $DL_{23}$ (=1) corresponds to a sign-included lower-rank quantized DCT coefficients $FL_{23}$ (=(−)1) in FIG. 11.

As shown in FIG. 13, in the bit sequence B2, the higher-rank quantized DCT coefficient $DH_{23}$ (=0) is represented by a 10 bit binary number "000000000". In the bit sequence K, the lower-rank quantized DCT coefficient $DL_{23}$ (=1) is represented by binary number "1" and the remaining 4 bits J0 are represented by binary number "0000". The bit sequence K is obtained by removing the "minus" additional sign bit F(−) from the sign-included lower-rank quantized DCT coefficient $FL_{23}$ (=(−)1) . The bit sequence B2 corresponds to the higher-rank bit sequence B2 in FIG. 4, and the bit sequence K corresponds to the lower-rank bit sequence K in FIG. 4.

The higher-rank bit sequence B2 and the lower-rank bit sequence K are subjected to a left shift processing. This left shift processing is the inverse of the right shift processing, that is, moves a bit pattern in the bit sequence left. In a case of a 1 bit left shift processing, a bit pattern in the bit sequence B2 is shifted left by 1 bit worth, so that a sign bit F0 is shifted off the end of the bit sequence B2. Then, the lower-rank bit sequence K is assigned to the right end (LSB) in the bit sequence B2. Consequently, the bit sequence B2 is converted to the bit sequence B1, in which the 11 bit binary number "00000000001" is represented. In the bit sequence B1, the MSB is used to represent a positive sign bit F, and a value of the binary number "00000000001" is "1" in decimal notation.

Since the sign-included lower-rank coefficient $FL_{23}$ (=(−) 1) has the "minus" additional sign bit F(−), which indicates a negative, the value "1" is multiplied by −1, so that the bit sequence B1 is converted to the bit sequence B0, in which the 11 bit binary number "11111111111" is represented. The sign bit F is now a negative "1" and the 4 bits J0 are now "1111". A value of the binary number "11111111111" is −1 in decimal notation, and corresponds to the value of quantized DCT coefficient $D_{23}$ (=−1).

As described above, the bit sequence B2 of the higher-rank quantized DCT coefficient $DH_{23}$ (=0) is subjected to a 1 bit left shift processing, so that the bit sequence B2 is converted to the bit sequence B1. Then, since the sign-included lower-rank bit sequence $FL_{23}$ (=(−)1) has a "minus" additional sign bit F(−), the value of the bit sequence B1 in decimal notation, that is, the value "1", is multiplied by −1, so that the bit sequence B0 of the quantized DCT coefficient $D_{23}$ (=−1) is obtained.

When a sign-included lower-rank quantized DCT coefficient $FL_{ji}$, which corresponds to a lower-rank quantized DCT coefficient $DL_{ji}$ being subjected to the bit synthesis processing, has a "plus " additional sign bit F(+) (for example, $FL_{03}$, shown in FIG. 11), a bit sequence of a corresponding higher-rank quantized DCT coefficient $DH_{ji}$ is subjected to a 1 bit left shift processing, so that a value of a corresponding quantized DCT coefficient $D_{ji}$ is directly obtained.

When an "n" (n=1, 2, . . . ) bit left shift processing is executed, a bit pattern in the bit sequence is shifted left by "n" bits worth, so that "n" bits from the left end (MSB), within the 16 bits, are separated from the bit sequence leaving an "n" bits blank position available "n" bits from the right end (LSB). Then, the lower-rank bit sequence of "n" bits is assigned to the available blank position "n" bits from the left right end (LSB) in the bit sequence. Namely, the lower-rank bit sequence is shifted onto a portion of "n" bits from the right end (LSB)in the bit sequence. At this time, the bit number of the lower-rank bit sequence is "n". A bit number of the left shift processing depends on and usually equals a bit number of the right shift processing in the compression process.

As described above, the bit synthesis processing synthesizes the bit sequences of the higher-rank quantized DCT coefficients $DH_{ji}$ and the bit sequences of the lower-rank quantized DCT coefficients $DL_{ji}$ so that the bit sequence of the quantized DCT coefficients $D_{ji}$ are obtained. When the corresponding sign-included lower-rank quantized DCT coefficients $FL_{ji}$ have a "minus" sign bit F(−), the positive value of the bit sequence in decimal notation is multiplied by −1, so that the actual corresponding quantized DCT coefficients $D_{ji}$ are obtained. Conversely, when the corresponding sign-included lower-rank quantized DCT coefficients $FL_{ji}$ have a "plus" sign bit F(+), the quantized DCT coefficients $D_{ji}$ are directly obtained by the bit synthesis processing.

Figure 14:
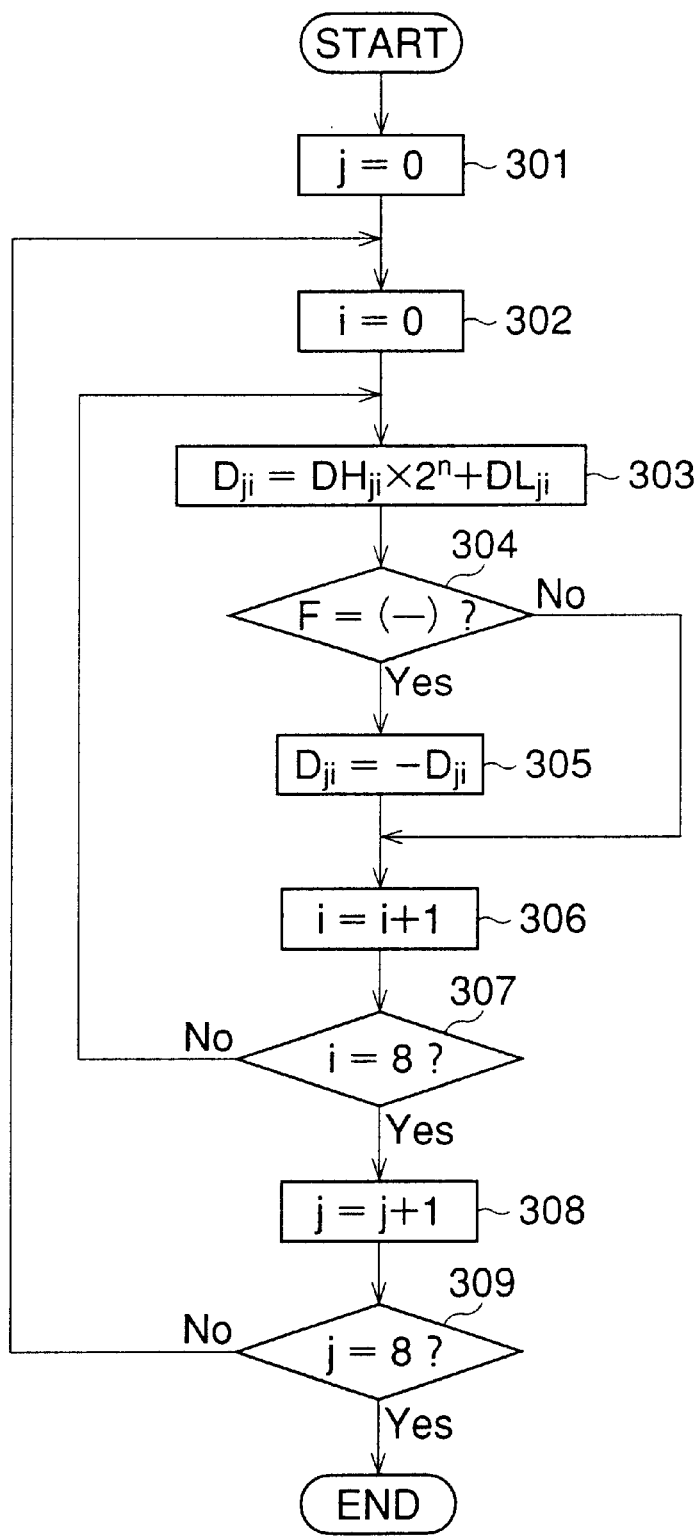
FIG. 14 is a flowchart showing a bit synthesis process routine.

FIG. 14 is a flowchart showing the bit synthesis processing routine of bit synthesis processing circuit 33 in FIG. 10.

In Step 301, the suffix "j" is set to 0. In Step 302, the suffix "i" is set to 0, such that higher-rank quantized DCT coefficients $DH_{j0}$ and lower-rank quantized DCT coefficients $DL_{j0}$, which are arranged in the left-most column in the higher-rank quantized DCT coefficient matrix DH and the lower-rank quantized DCT coefficient matrix DL, respectively, are subjected to the bit synthesis processing first. Initially, for example, the higher-rank quantized DCT coefficient $DH_{00}$ (=65 in FIG. 11) and the lower-rank quantized DCT coefficient $DL_{00}$ (=1) are subjected to the bit synthesis processing.

In Step 303, the bit sequence of the higher-rank quantized DCT coefficient $DH_{ji}$ is subjected to the "n" bits left shift processing, such that the quantized DCT coefficient $D_{ji}$ is obtained. The quantized DCT coefficient $D_{ji}$ is obtained by the following equation:

$$D_{ji}=DH_{ji}\times 2^n+DL_{ji}$$

For example, when the higher-rank quantized DCT coefficient $DH_{23}$ (=0) and the lower-rank quantized DCT coefficient $DL_{23}$ (=1) undergo the bit synthesis of 1 bit, the quantized DCT coefficient $D_{23}$ is obtained:

$$D_{23}=0\times 2^1+1=1$$

Further, for example, when the higher-rank quantized DCT coefficient $DH_{23}$ (=0) and the lower-rank quantized DCT coefficient $DL_{23}$ (=1) undergo the bit synthesis of 3 bits, the quantized DCT coefficient $D_{23}$ is obtained:

$$D_{23}=0\times 2^3+1=1$$

Note that the choice of the bit number of the bit synthesis processing depends on the bit number of the bit separation processing during compression.

In Step 304, it is determined whether the corresponding sign-included lower-rank quantized DCT coefficient $FL_{ji}$ has a "plus" additional sign bit F(+). This sign-included lower-rank quantized DCT coefficient $FL_{ji}$ corresponds to the lower-rank quantized DCT coefficient $DL_{ji}$, which is subjected to the bit synthesis processing in Step 303. When the sign-included lower-rank quantized DCT coefficient $FL_{ji}$ has a "plus" additional sign bit F(+), the process goes to Step 306. Conversely, when the sign-included lower-rank quantized DCT coefficient $FL_{ji}$ has a "minus" additional sign bit F(-), Step 305 is executed. In Step 305, the value of the quantized DCT coefficient $D_{ji}$ is multiplied by −1, so that the positive value of the quantized DCT coefficient $D_{ji}$ is converted to the corresponding negative value.

In Step 306, the suffix "i" is incremented by 1, and in Step 307, it is determined whether the suffix "i" is equal to 8. When the suffix "i" is equal to 8, the process goes to Step 308. Conversely, when the suffix "i" is not equal to 8, Step 303 is executed again, such that a quantized DCT coefficient $D_{ji+1}$ is subjected to the bit synthesis processing.

In Step 308, the suffix "j" is incremented by 1. In Step 309, it is determined whether the Suffix "j" is equal to 8. When the suffix "j" is equal to 8, the bit synthesis processing finishes, and when the suffix "j" is not equal to 8, Step 302 is executed again, such that a next row of quantized DCT coefficients $D_{j+1i}$ is subjected to the bit synthesis processing.

As described above, the higher-rank quantized DCT coefficients $DH_{ji}$ and the lower-rank quantized DCT coefficients $DL_{ji}$ are subjected to a bit synthesis processing, so that the quantized DCT coefficients Di are obtained, and the compressed image data is expanded. Namely, the original still image is reproduced.

In this embodiment, since the rounding-off errors are negligible, an original still image is identically reproducible, that is, a still image can be compressed and expanded with no or negligible degradation in picture quality by the compression and expansion device of the embodiment.

In order to compare the compression method of this embodiment with a conventional compression method utilizing the JPEG algorithm, respective compression ratios were measured when compressing a specific high-resolution still image without quantization. A compression method according to the present invention was used with a bit separation of 2 bits.

Consequently, a compression ratio according to the conventional compression method was 75.6%, whereas, a compression ratio according to the present embodiment was 69.9%. Thus, it can be seen that the image compression device according to the present invention compresses a still image more efficiently, even when quantization is not executed in the compression process.

From this result, the DCT coefficients may be directly subjected to the bit separation processing without dequantization recovery. At this time, the DCT coefficients are directly obtained by bit synthesis processing in the expansion process.

As described above, in the compression process, the total bit number of compressed image data is decreased by the bit separation processing. Therefore, the total bit number of the compressed image data fully decreases by only bit separation processing, without reversing a sign of the quantized DCT coefficient $D_{ji}$.

Figure 15:
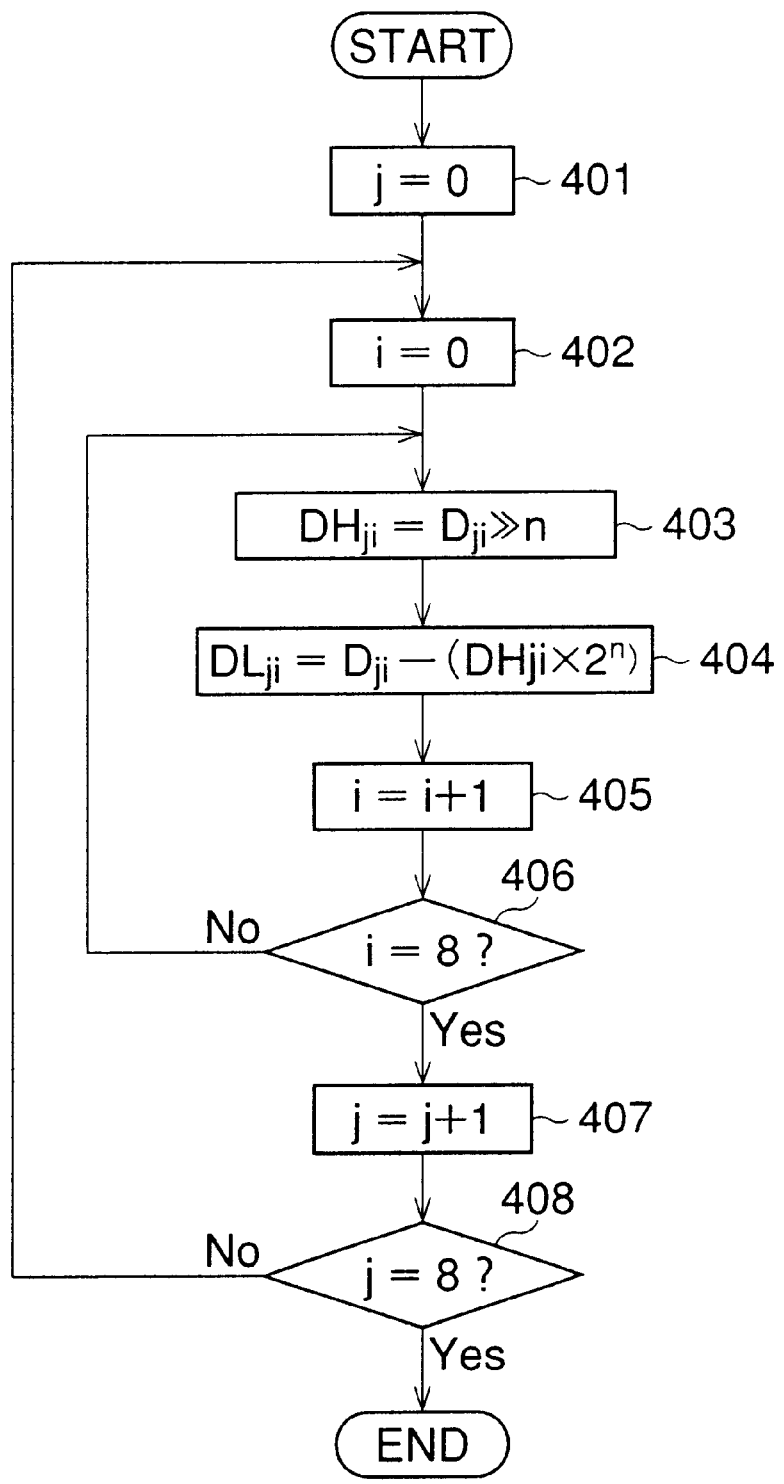
FIG. 15 is a flowchart showing a bit separation process routine according to an image compression device of a second embodiment of the present invention.

FIG. 15 is a flowchart showing a bit separation processing routine, according to an image compression device of a second embodiment of the present invention. The image compression device of the second embodiment comprises a DCT processing circuit, a quantization processing circuit, a bit separation processing circuit, a grouping processing circuit, and an encoding processing circuit (all not shown). Each circuit in the image compression device of the second embodiment is similar to the corresponding circuit in the image compression device of the first embodiment. Namely, a block diagram of the image compression device of the second embodiment is similar to the block diagram shown in FIG. 1. Thus, the description of the block diagram of the second embodiment is omitted. Note that, in the second embodiment, the conventional table T0 shown in FIG. 6 is used in the grouping processing circuit in place of the table T1.

The execution of Step 401 and Step 402 correspond to the execution of Step 201 and Step 202 in FIG. 9. Similarly, the execution of Steps 403 to 404 correspond to the execution of Steps 207 to 208 in FIG. 9. In Step 403, all quantized DCT coefficients $D_{ji}$ are directly subjected to the bit separation processing. The execution of Steps 405 to 408 correspond to the execution of Steps 210 to 213 in FIG. 9. In the flowchart in FIG. 15, there are no Steps corresponding to Steps 203 to 206 and Step 209 shown in FIG. 9. Namely, in the second embodiment, negative quantized DCT coefficients $D_{ji}$ are not multiplied by −1, and an additional sign bit is not added to lower-rank qunatized DCT coefficients $DL_{ji}$.

As described above, the bit separation processing separates the quantized DCT coefficients $D_{ji}$, such that the higher-rank quantized DCT coefficients $DH_{ji}$ and lower-rank quantized DCT coefficients $DL_{ji}$ are obtained. Consequently, the total bit number of the compressed data decreases.

Figure 16:
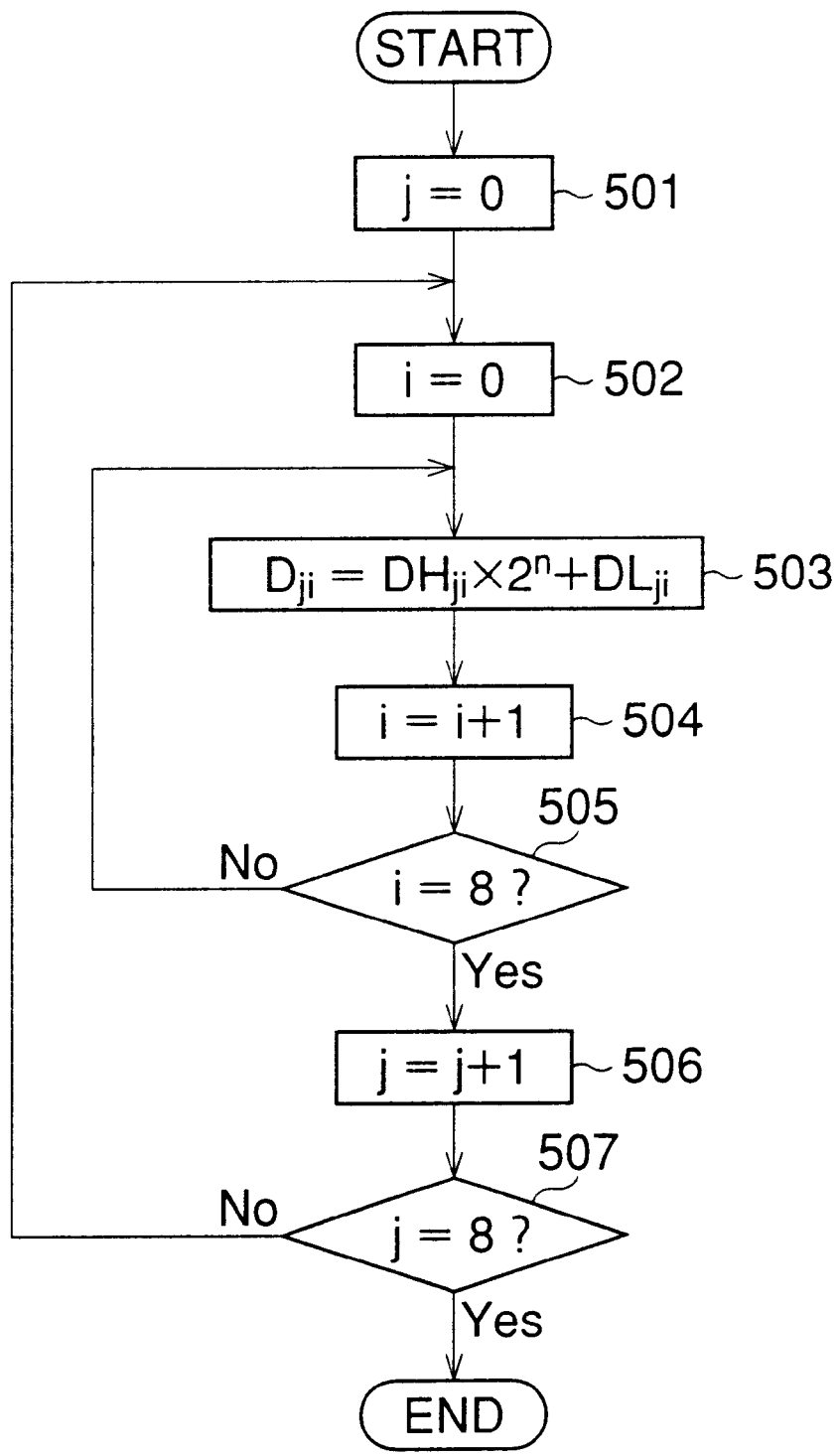
FIG. 16 is a flowchart showing a bit synthesis process routine according to an image expansion device of the second embodiment of the present invention.

FIG. 16 is a flowchart showing a bit synthesis processing routine, according to an image expansion device of the second embodiment of the present invention. The image expansion device of the second embodiment comprises a decoding processing circuit, an inverse grouping processing circuit, a bit synthesis processing circuit, a quantization processing circuit, and an IDCT processing circuit (all not shown). A block diagram of the image expansion device of the second embodiment is similar to the block diagram of the image expansion device of the first embodiment in FIG. 10.

Thus, the description of the block diagram of the second embodiment is omitted.

The execution of Steps 501 to 503 correspond to Steps 301 to Step 303 in FIG. 14. Similarly, Steps 504 to 507 correspond to Steps 306 to 309. Namely, the lower-rank quantized DCT coefficients $DL_{ji}$ and the higher-rank quantized DCT coefficients $DH_{ji}$ are subjected to a bit synthesis processing (a left shift processing) in Step 503, so that the quantized DCT coefficients $D_{ji}$ are directly obtained.

As described above, the bit synthesis processing synthesizes the higher-rank quantized DCT coefficients $DH_{ji}$ and the lower-rank quantized DCT coefficients $DL_{ji}$, such that the quantized DCT coefficients $D_{ji}$ are obtained. Thus, the original image data is reproduced.

Similarly to the first embodiment, a compression ratio of the second embodiment and a compression ratio of the conventional compression method, were respectively measured when compressing a specific high-resolution still image without quantization. A compression method according to the present invention was used with a bit separation of 2 bits.

Consequently, a compression ratio according to the conventional compression method was 75.6%, whereas, a compression ratio according to the present embodiment was 70.9%. Thus, it can be seen that the image compression device according to the present invention compresses a still image more efficiently.

In the second embodiment, the DCT coefficients may be directly subjected to the bit separation processing without dequantization recovery. At this time, the DCT coefficients are directly obtained by bit synthesis processing in the expansion process, similarly to the first embodiment.

In a modification, a Hadamard's transformation, well-known in the Field, which is an orthogonal transformation, may be applied in place of the DCT processing. In this case, an inverse Hadamard's transformation is applied in place of the IDCT processing.

Further, in a modification, other entropy encoding and decoding process (for example, an Arithmetic encoding and decoding) may be applied in place of the Huffman-encoding and Huffman-decoding.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 10-193122 (filed on Jul. 8, 1998) and No. 10-178891 (filed on Jun. 25, 1998) which are expressly incorporated herein, by reference, in their entireties.

What is claimed is:

1. An image compression device comprising:

an orthogonal transformation processor that applies an orthogonal transformation to image data corresponding to a still image to obtain orthogonal transformation coefficients;

a determiner that determines whether a sign of each of said orthogonal transformation coefficients expressed as a bit sequence is negative;

a calculator that manipulates said bit sequence to reverse said sign, when said sign is negative;

a bit separation processor that separates one of said bit sequence when said sign of said orthogonal transformation coefficient is positive and a manipulated bit sequence when said sign of said orthogonal transformation coefficient is negative to a higher-rank bit sequence and a lower-rank bit sequence to obtain a higher-rank orthogonal transformation coefficient and a lower-rank orthogonal transformation coefficient;

a sign bit addition processor that adds one of an additional positive-sign bit to said lower-rank bit sequence when said orthogonal transformation coefficient is positive and an additional negative-sign bit to said lower-rank bit sequence when said orthogonal transformation coefficient is negative to obtain a sign-included lower-rank orthogonal transformation coefficient;

a grouping processor that utilizes a group table to obtain zero run lengths, group numbers and added bits of said higher-rank orthogonal transformation coefficients; and an encoding processor that utilizes a Huffman table to determine a codeword corresponding to each of said zero run lengths and said group numbers, and combines said added bits and said codeword to generate compressed image data.

2. The image compression device of claim 1, further comprising a quantization processor that quantizes said orthogonal transformation coefficients in accordance with corresponding quantization coefficients to obtain quantized orthogonal transformation coefficients.

3. The image compression device of claim 2, wherein said determiner determines whether a sign of each of said quantized orthogonal transformation coefficients expressed as a bit sequence is negative, said calculator manipulating said bit sequence to reverse said sign when said sign is negative, and said bit separation processor separating one of said bit sequence when said sign of said quantized orthogonal transformation coefficient is positive and a manipulated bit sequence when said sign of said quantized orthogonal transformation coefficient is negative to a higher-rank bit sequence and lower-rank bit sequence to obtain a higher-rank quantized orthogonal transformation coefficient and a lower-rank quantized orthogonal transformation coefficient.

4. The image compression device of claim 1, wherein said bit separation processor executes a right-shift processing to convert one of said bit sequence and said manipulated bit sequence to said higher-rank bit sequence, and to obtain said lower-rank bit sequence separated from said one of said bit sequence and said manipulated bit sequence.

5. The image compression device of claim 1, wherein said group table has a column showing significant coefficients that are positive.

6. An image compression and expansion device comprising:

an orthogonal transformation processor that applies an orthogonal transformation to image data corresponding to a still image to obtain orthogonal transformation coefficients;

a determiner that determines whether a sign of each of said orthogonal transformation coefficients expressed as a bit sequence is negative;

a calculator that manipulates said bit sequence to reverse said sign, when said sign is negative;

a bit separation processor that separates one of said bit sequence when said sign of said orthogonal transformation coefficient is positive and a manipulated bit sequence when said sign of said orthogonal transformation coefficient is negative to a higher-rank bit sequence and a lower-rank bit sequence to obtain a higher-rank orthogonal transformation coefficient and a lower-rank orthogonal transformation coefficient;

a sign bit addition processor that adds one of an additional positive-sign bit to said lower-rank bit sequence when said orthogonal transformation coefficient is positive and an additional negative-sign bit to said lower-rank bit sequence when said orthogonal transformation coefficient is negative to obtain a sign-included lower-rank orthogonal transformation coefficient;

a grouping processor that utilizes a group table to obtain zero run lengths, group numbers and added bits of said higher-rank orthogonal transformation coefficients;

an encoding processor that utilizes a Huffman table to determine a codeword corresponding to each of said zero run lengths and said group numbers, and combines said added bits and said codeword to generate compressed image data;

a decoding processor that utilizes said Huffman table to obtain said zero run lengths and said group numbers corresponding to said codewords from said compressed data;

an inverse grouping processor that utilizes said group table to reproduce said higher-rank orthogonal transformation coefficients, based on said zero run lengths, said group numbers and said added bits;

a bit synthesis processor that synthesizes said higher-rank bit sequence reproduced from said reproduced higher-rank orthogonal transformation coefficients and said lower-rank bit sequence reproduced by removing one of said additional negative-sign bit and said additional positive-sign bit from said sign-included lower-rank orthogonal transformation coefficients to obtain said orthogonal transformation coefficients expressed as one of said manipulated bit sequence and said bit sequence;

an inverse determiner that determines whether said sign-included lower-rank orthogonal transformation coefficient, corresponding to said lower-rank orthogonal transformation coefficient being subjected to a synthesis of said bit synthesis processor, has said additional negative-sign bit;

an inverse calculator that manipulates said manipulated bit sequence to reverse a sign of corresponding reproduced orthogonal transformation coefficients when said sign-included lower-rank orthogonal transformation coefficient has said additional negative-sign bit; and an inverse orthogonal transformation processor that applies an inverse orthogonal transformation to said reproduced orthogonal transformation coefficients to obtain said image data corresponding to said still image.

7. The image compression and expansion device of claim 6, further comprising a quantization processor that quantizes said orthogonal transformation coefficients in accordance with corresponding quantization coefficients to obtain quantized orthogonal transformation coefficients.

8. The image compression and expansion device of claim 7, wherein said determiner determines whether a sign of each of said quantized orthogonal transformation coefficients expressed as a bit sequence is negative, said calculator manipulating said bit sequence to reverse said sign when said sign is negative, and said bit separation processor separating one of said bit sequence when said sign of said quantized orthogonal transformation coefficient is positive and a manipulated bit sequence when said sign of said quantized orthogonal transformation coefficient is negative to a higher-rank bit sequence and a lower-rank bit sequence to obtain a higher-rank quantized orthogonal transformation coefficient and a lower-rank quantized orthogonal transformation coefficient.

9. The image compression and expansion device of claim 7, further comprising a dequantization processor that dequantizes said quantized orthogonal transformation coefficients to obtain said reproduced orthogonal transformation coefficients.

10. The image compression and expansion device of claim 6, wherein said bit separation processor executes a right-shift processing to convert one of said bit sequence and said manipulated bit sequence to said higher-rank bit sequence, and to obtain said lower-rank bit sequence separated from said one of said bit sequence and said manipulated bit sequence.

11. The image compression and expansion device of claim 6, wherein said bit synthesis processor executes a left-shift processing to said higher-rank bit sequence to obtain one of said manipulated bit sequence and said bit sequence, said left-shift processing shifting said lower-rank bit sequence to said higher-rank bit sequence.

12. The image compression and expansion device of claim 6, wherein said group table has a column showing significant coefficients that are positive.

13. An image expansion device that expands compressed image data composed of first data and second data, said first data being generated by an orthogonal transformation, bit separation processing and entropy encoding, said second data being composed of sign bit data indicating one of a positive and a negative and separation data generated by said bit separation processing, said first data corresponding to higher-rank orthogonal transformation coefficients and said separation data corresponding to lower-rank orthogonal transformation coefficients and being expressed as a lower-rank bit sequence, said device comprising:

an decoding processor that decodes said first data by an entropy decoding process to obtain said higher-rank orthogonal transformation coefficients expressed as higher-rank bit sequences;

a bit synthesis processor that synthesizes said higher-rank bit sequence of each of said higher-rank orthogonal transformation coefficients and said lower-rank bit sequence of said corresponding separation data to obtain orthogonal transformation coefficients;

a determiner that determines whether said sign bit data corresponding to said separation data being subjected to a synthesis by said bit synthesis processor is negative;

a calculator that reverses a sign of said orthogonal transformation coefficients when said corresponding sign bit data is negative; and an inverse orthogonal transformation processor that applies said inverse orthogonal transformation coefficients to obtain image data corresponding to a still image.

14. An image compression device comprising:

an orthogonal transformation processor that applies an orthogonal transformation to image data corresponding to a still image to obtain orthogonal transformation coefficients expressed as bit sequences;

a bit separation processor that separates each of said bit sequences to a higher-rank bit sequence and a lower-rank bit sequence to obtain a higher-rank orthogonal transformation coefficient and a lower-rank orthogonal transformation coefficient;

a grouping processor that utilizes a group table to obtain zero run lengths, group numbers and added bits of said higher-rank orthogonal transformation coefficients; and an encoding processor that utilizes a Huffman table to determine a codeword corresponding to each of said zero run lengths and said group numbers, and combines said added bits and said codeword to generate compressed image data.

15. An image compression and expansion device comprising;
   an orthogonal transformation processor that applies an orthogonal transformation to image data corresponding to a still image to obtain orthogonal transformation coefficients expressed as bit sequences;
   a bit separation processor that separates each of said bit sequences to a higher-rank bit sequence and a lower-rank bit sequence to obtain a higher-rank orthogonal transformation coefficient and a lower-rank orthogonal transformation coefficient;
   a grouping processor that utilizes a group table to obtain zero run lengths, group numbers and added bits of said higher-rank orthogonal transformation coefficients;
   an encoding processor that utilizes a Huffman table to determine a codeword corresponding to each of said zero run lengths and said group numbers, and combines said added bits and said codeword to generate compressed image data;
   a decoding processor that utilizes said Huffman table to obtain said zero run lengths and said group numbers corresponding to said codewords from said compressed data;
   an inverse grouping processor that utilizes said group table to reproduce said higher-rank orthogonal transformation coefficients, based on said zero run lengths, said group numbers and said added bits;
   a bit synthesis processor that synthesizes said higher-rank bit sequence of said reproduced higher-rank orthogonal transformation coefficients and said lower-rank bit sequence of said lower-rank orthogonal transformation coefficients to obtain said orthogonal transformation coefficients expressed as said bit sequences; and
   an inverse orthogonal transformation processor that applies an inverse orthogonal transformation to said reproduced orthogonal transformation coefficients to obtain said image data corresponding to said still image.

16. An image expansion device that expands compressed image data which is composed of first data and second data, said first data being generated by an orthogonal transformation, a bit separation processing and an entropy encoding, and said second data being generated by said bit separation processing, said first data corresponding to higher-rank orthogonal transformation coefficients, and said second data corresponding to lower-rank orthogonal transformation coefficients and being expressed as a lower-rank bit sequence, said device comprising:
   a decoding processor that decodes said first data by an entropy decoding process to obtain said higher-rank orthogonal transformation coefficients expressed as higher-rank bit sequences;
   a bit synthesis processor that synthesizes said higher-rank bit sequence of each of said higher-rank orthogonal transformation coefficients and said lower-rank bit sequence of said corresponding second data to obtain orthogonal transformation coefficients; and
   an inverse orthogonal transformation processor that applies an inverse orthogonal transformation to said orthogonal transformation coefficients to obtain image data corresponding to a still image.

* * * * *